Feb. 22, 1955  F. CAMPOS  2,702,670
DELAYED CARRY FOR STORAGE REGISTERS
Filed Feb. 19, 1951  18 Sheets-Sheet 5
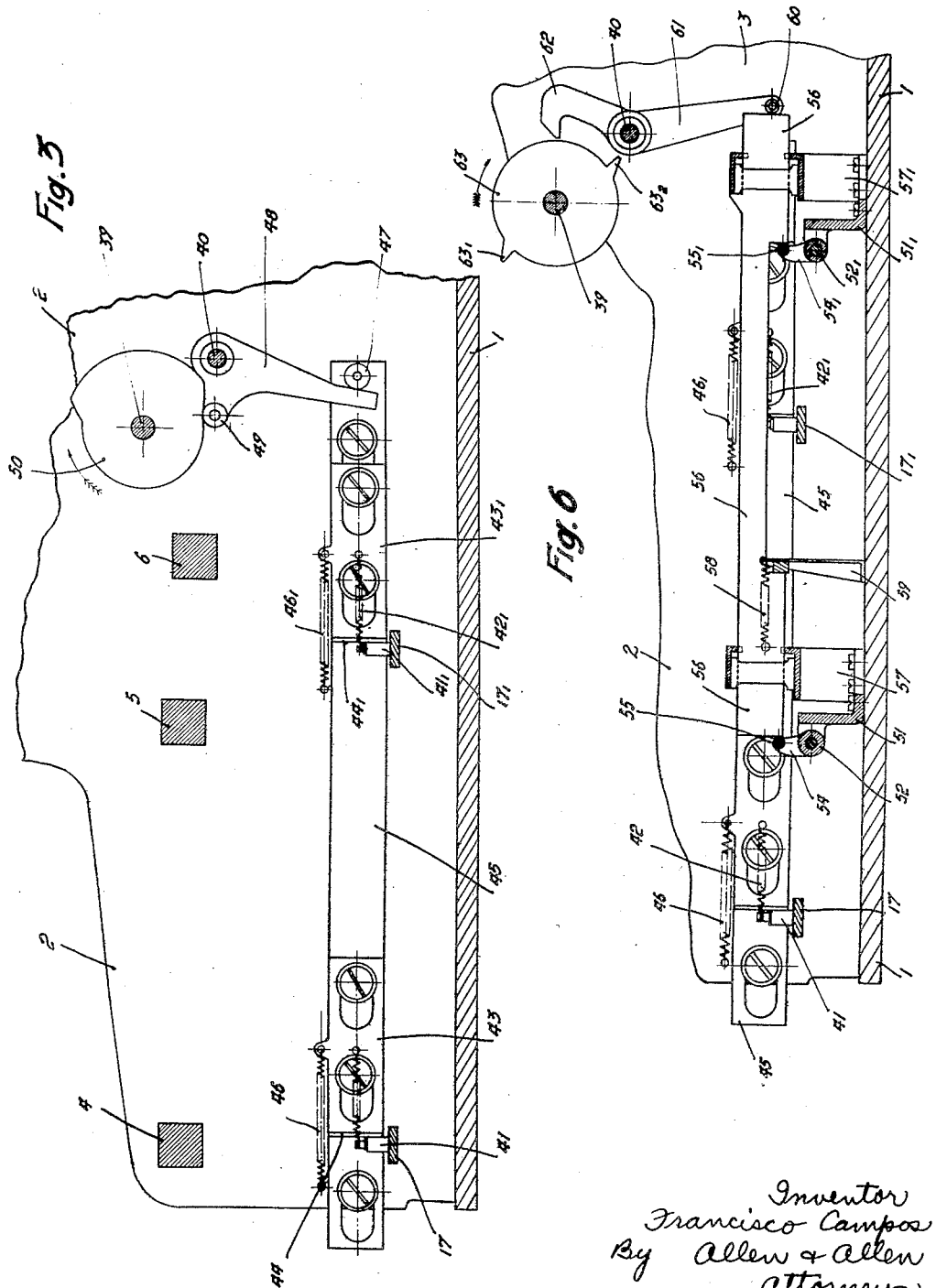
Inventor
Francisco Campos
By Allen & Allen
attorneys

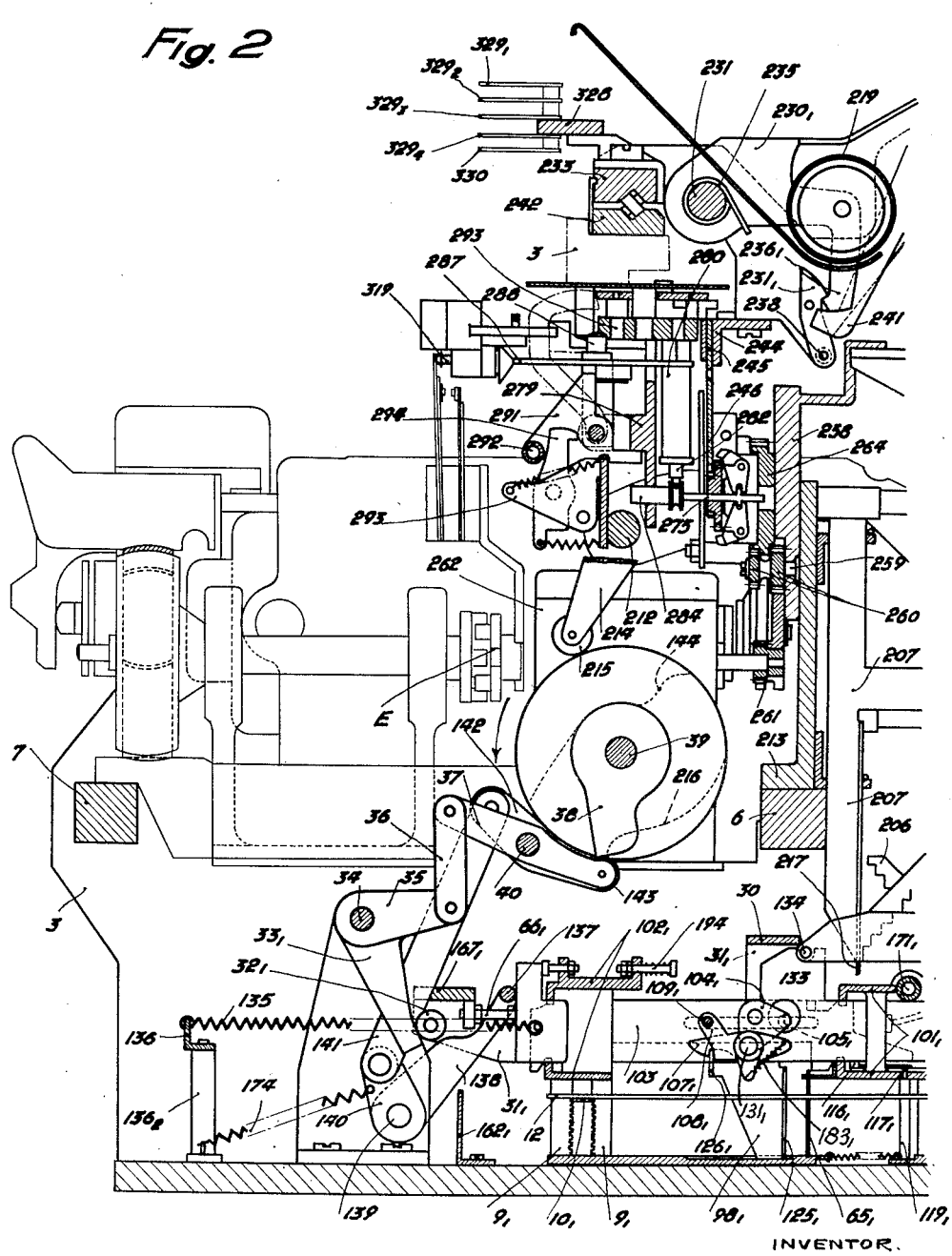

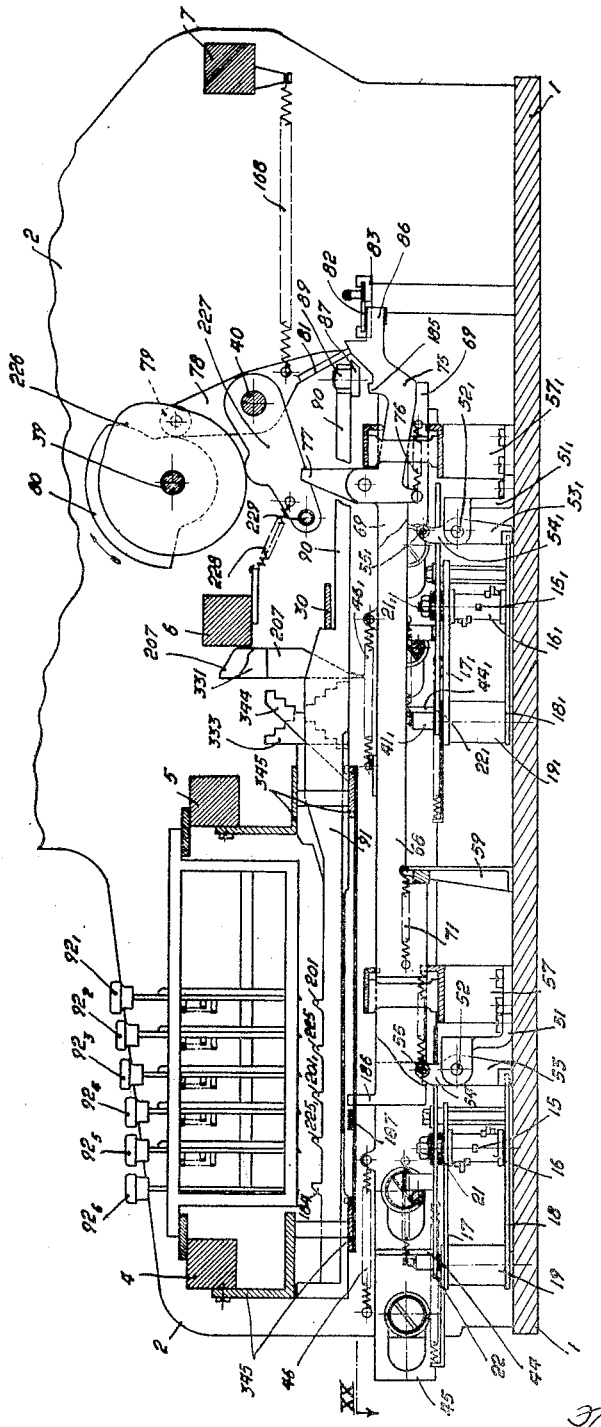

Feb. 22, 1955  F. CAMPOS  2,702,670
DELAYED CARRY FOR STORAGE REGISTERS
Filed Feb. 19, 1951  18 Sheets-Sheet 7
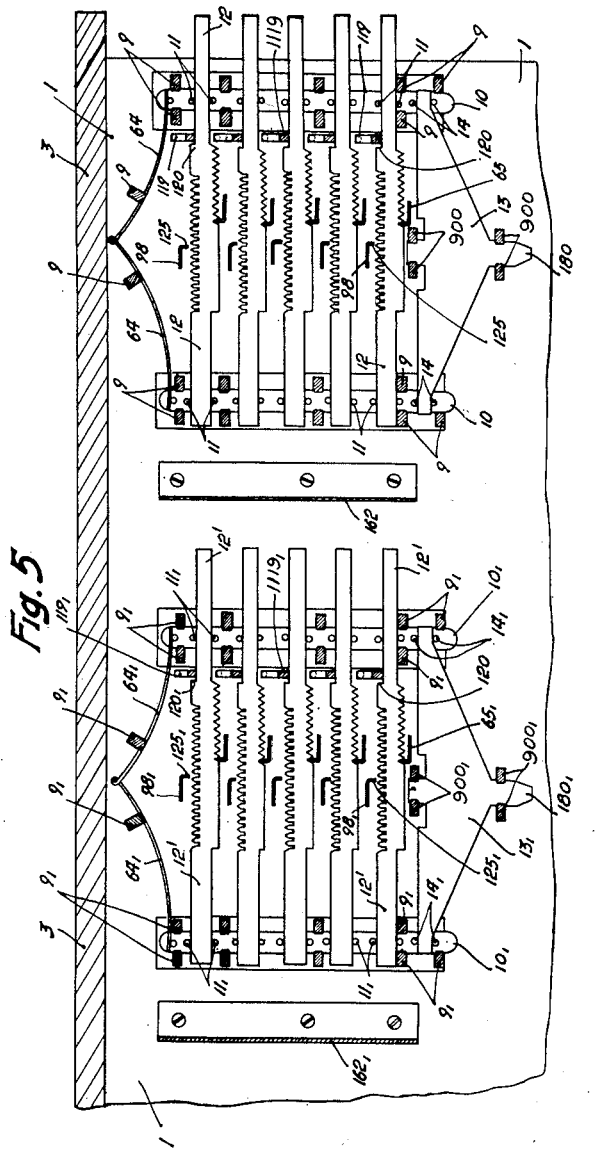
Inventor
Francisco Campos
By Allen & Allen
Attorneys

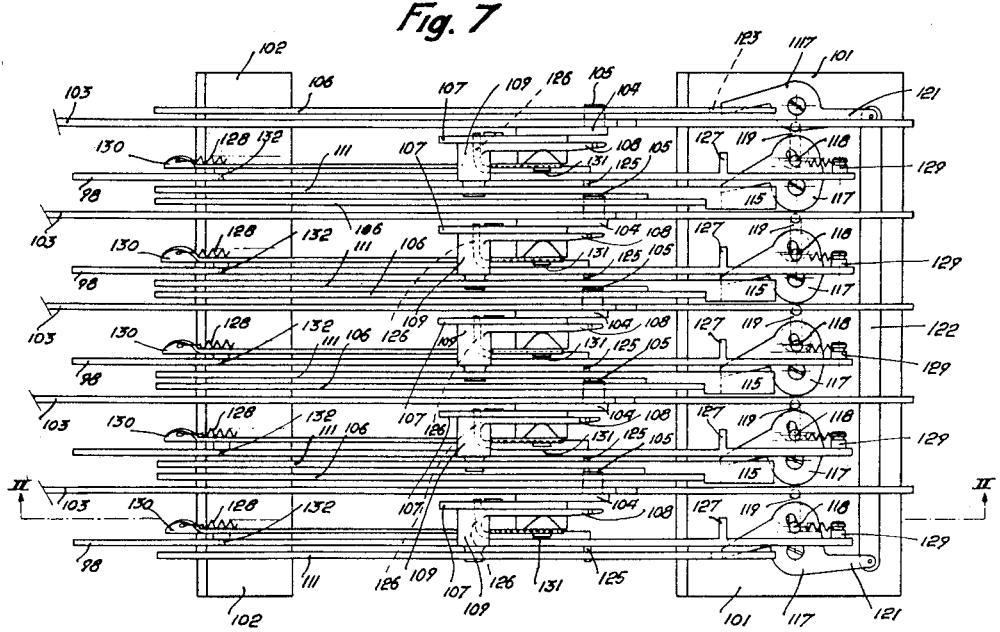

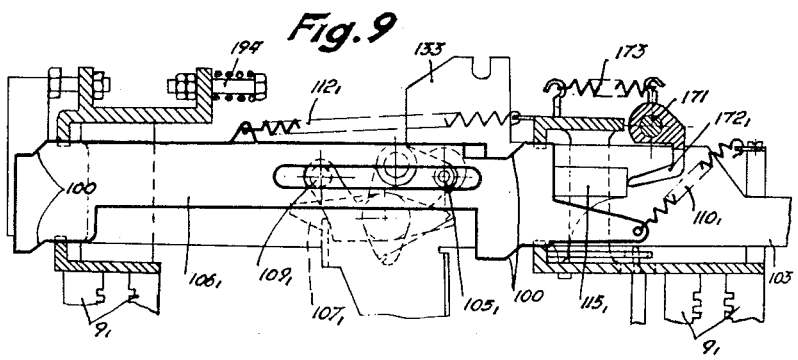
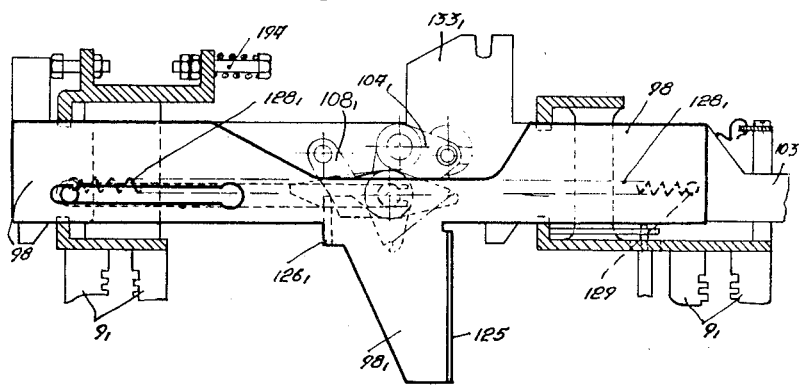
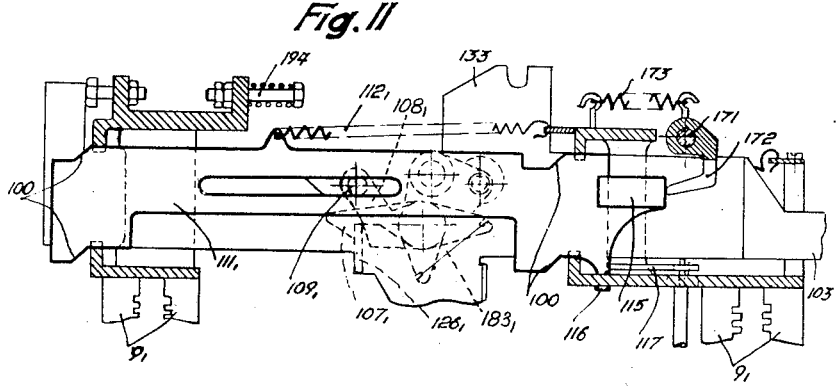

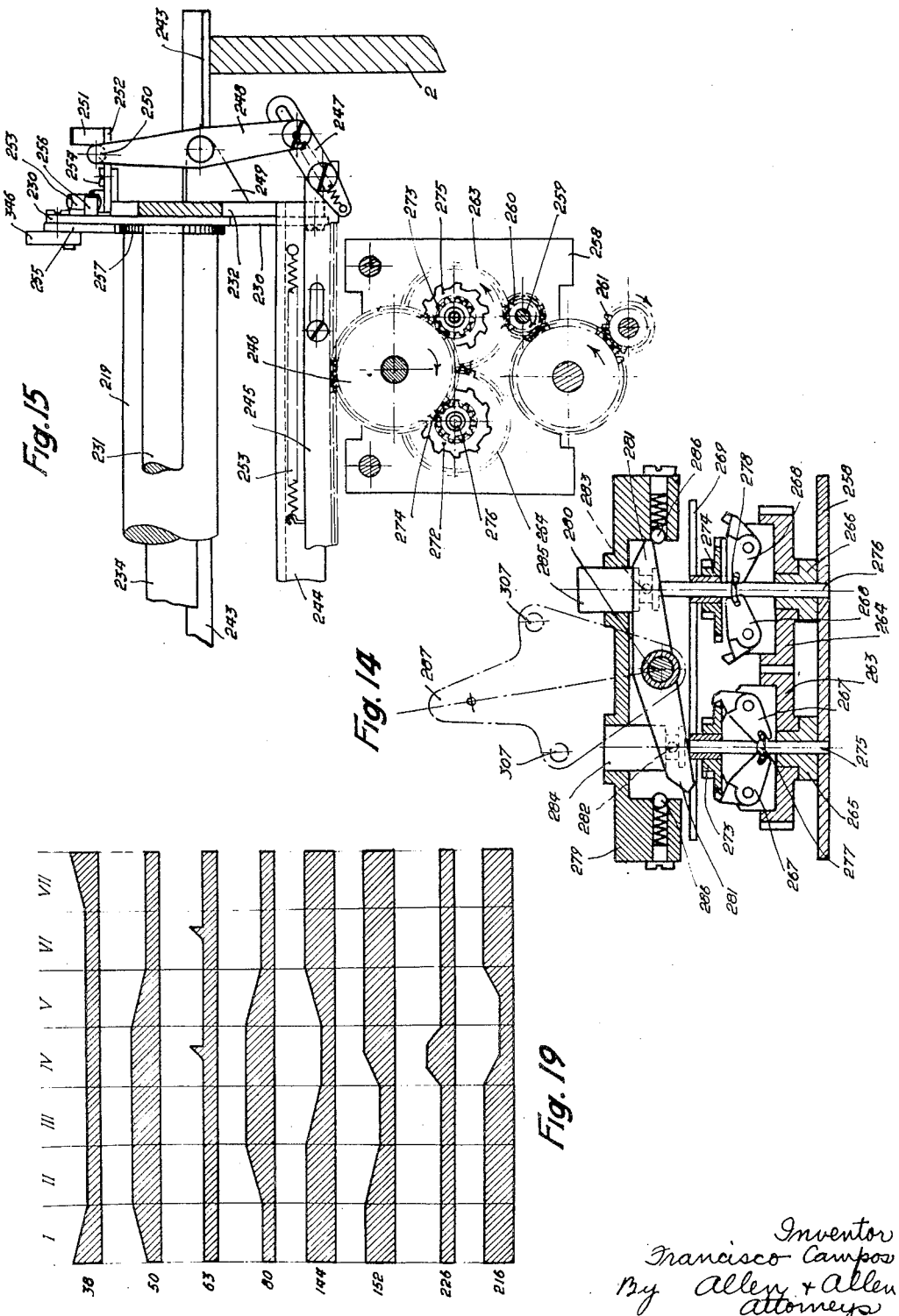

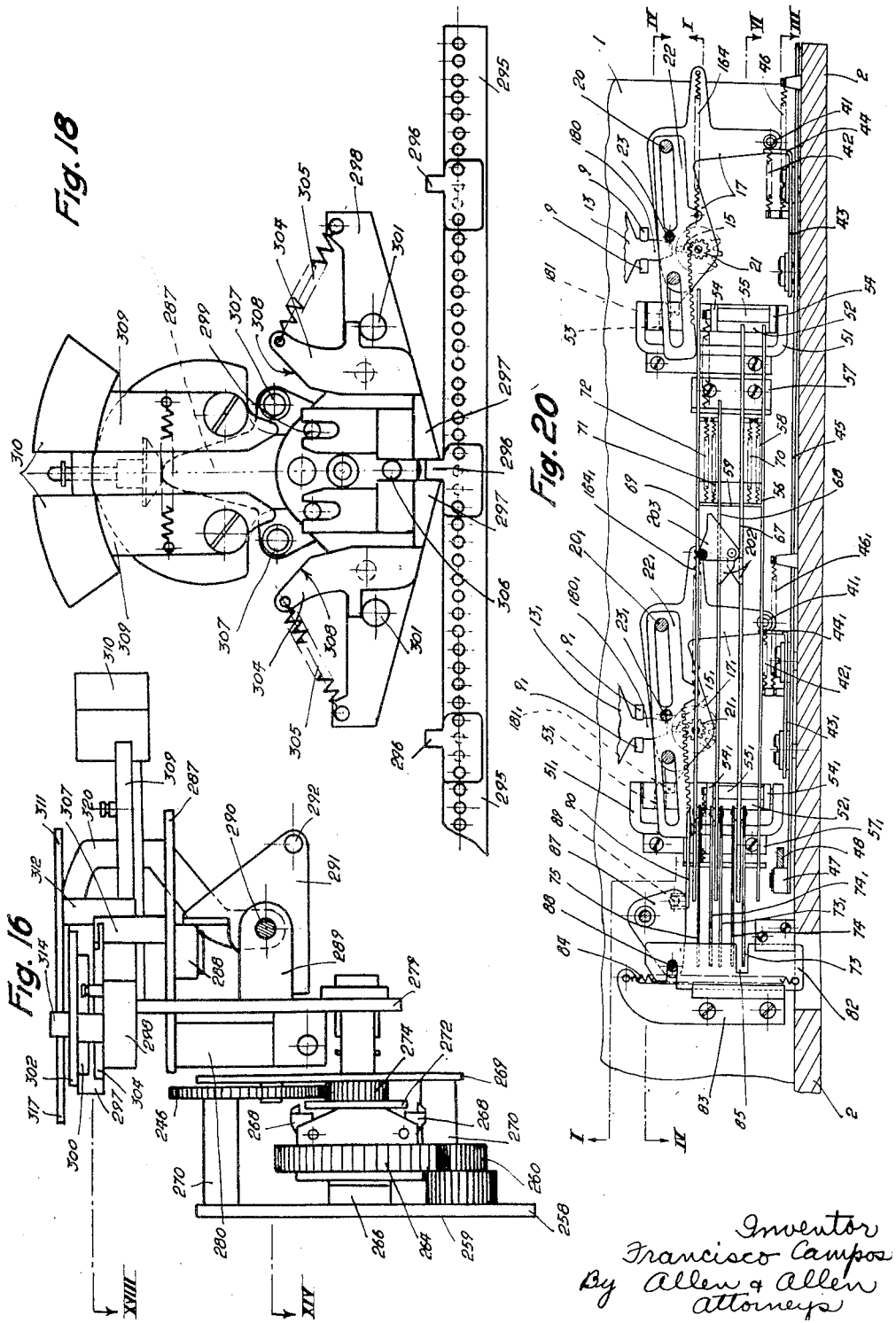

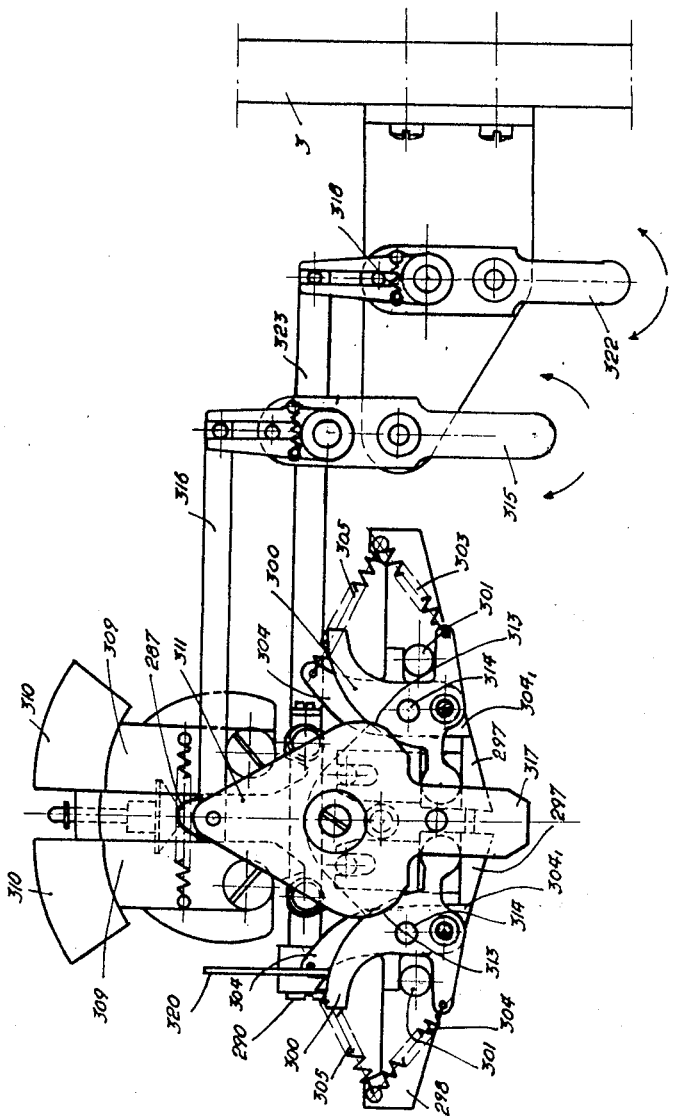

Feb. 22, 1955    F. CAMPOS    2,702,670
DELAYED CARRY FOR STORAGE REGISTERS
Filed Feb. 19, 1951    18 Sheets-Sheet 14

Inventor
Francisco Campos
By Allen & Allen
attorneys

Feb. 22, 1955   F. CAMPOS   2,702,670
DELAYED CARRY FOR STORAGE REGISTERS
Filed Feb. 19, 1951   18 Sheets-Sheet 15

INVENTOR.
FRANCISCO CAMPOS,
BY Allen & Allen
ATTORNEYS.

Feb. 22, 1955  F. CAMPOS  2,702,670
DELAYED CARRY FOR STORAGE REGISTERS
Filed Feb. 19, 1951  18 Sheets-Sheet 16

INVENTOR.
FRANCISCO CAMPOS,
BY Allen & Allen
ATTORNEYS.

Feb. 22, 1955 F. CAMPOS 2,702,670
DELAYED CARRY FOR STORAGE REGISTERS
Filed Feb. 19, 1951 18 Sheets-Sheet 17
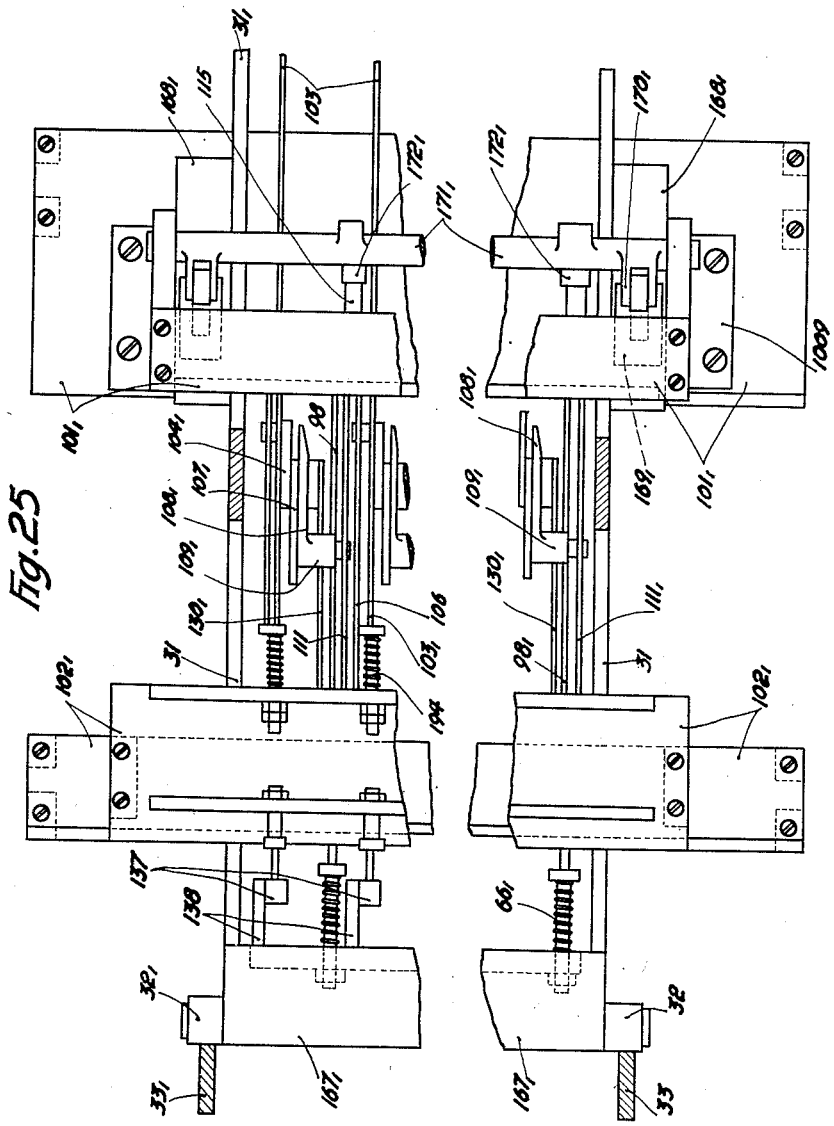
INVENTOR.
FRANCISCO CAMPOS,
BY Allen & Allen
ATTORNEYS.

Feb. 22, 1955　　　　　F. CAMPOS　　　　　2,702,670
DELAYED CARRY FOR STORAGE REGISTERS
Filed Feb. 19, 1951　　　　　　　　　　　18 Sheets-Sheet 18

INVENTOR.
FRANCISCO CAMPOS,
BY Allen & Allen
ATTORNEYS.

United States Patent Office 2,702,670
Patented Feb. 22, 1955

2,702,670

DELAYED CARRY FOR STORAGE REGISTERS

Francisco Campos, Paris, France, assignor to Societe Anonyme dite: Societe des Brevets Logabax, Paris, France, a corporation of France Application February 19, 1951, Serial No. 211,594

Claims priority, application France February 12, 1951

3 Claims. (Cl. 235—133)

The increasing complexity of economic problems in administrative work requires the use of highly improved calculating machines in order to accomplish statistics, accounting operations and the like.

The present invention concerns an improvement in mechanical elements in calculating machines presenting a great number of counters which are designed for accounting and statistical analysis and according to the machine described in U. S. Patent No. 2,562,172 dated July 31, 1951. This machine is essentially characterized in that it comprises a certain number of counting units respectively representing an "account," each of which is formed of a frame composed of parallel rods or slides which are shiftable in a longitudinal direction and are provided, lengthwise, with catches or teeth. The number of said teeth is equal to the number of units, less one, of the adopted basis of numeration, said slides forming the calculating elements. Each frame bears such rods or slides in a number equal to the number of numeration orders foreseen for the calculations to be accomplished. Mechanical means cooperate with the catches or teeth of said rods or slides, in order that one or more rods or slides in one or more counting units may be automatically moved lengthwise in one direction or the other, under the action of an electrical or any other motor and under the control of a keyboard comprising groups of keys corresponding to the various counting units and groups of calculating keys, said movements being proportional to the numbers represented by the calculating keys which are acted upon by the operator. Mechanical means are further provided in connection with said rods or slides in order that the recording or printing of the data of the operations and their results be insured.

In a machine of the above type, the carry-over or transfer operations are performed by means of rigid members simultaneously determining the advancement, by one tooth or unit, of the rod or slide corresponding to the immediate superior numeration order and the return to their position of mechanical members corresponding to the numeration order the basis of which has been gone by.

In the operation of the machine, the said rigid members move at a great speed, especially when carry-over or transfer operations have to be carried out in all the numeration orders simultaneously. The said members must therefore be reduced in weight, in order to reduce their inertia, and, as a consequence, they are apt to break rather easily. On another hand, always on account of the great speed at which the transfer operations must be carried out, the various members taking part in the said operations are of a great complexity and jammings may occur in the machine.

An object of the present invention is to provide means by which the operating speed of the transfer members can be reduced.

Another object is to provide means for allowing a time interval between the various steps of the transfer operations which, although taking place one after the other, are nevertheless initiated at the same time in all the driving members of the machine.

The present invention remedies to these inconveniences, in providing mechanical members to divide in two the functions of said rigid members and especially provided to allow a time interval between the various transfer functions which, though successive are nevertheless simultaneously borne by all the driving members of the machine.

The present invention has for its object, in a machine according to U. S. Patent No. 2,562,172, dated July 31, 1951, various improvements in the transfer device provided to insure an automatic transfer of one unit to a numeration order immediately superior when a slide of a certain order has gone through advancing movements representing a value at least equal to the number of units of the basis of numeration. The device comprises transfer members corresponding to the various numeration orders and each of which is connected, on the one hand, to ratchet members connecting the driving bar of the same numeration order to horizontal arms of the corresponding driving slide, and on the other, to a lever carried by a stop bar of the immediately superior numeration order. The transfer device is made so as to determine the uncoupling of the ratchet and of the horizontal arms of the considered slide and an advancing movement of said stop bar, with a certain time interval between those two operations, the advancing movement of said stop bar representing a value equal to one unit of the corresponding order and the horizontal arms of the driving slides remaining under the action of springs which impart to them a return movement corresponding to the number of units of the basis of numeration when their unclutching takes place. The essential improvement of said device consists in adding to the transfer bar proper a second bar or so called coupling and uncoupling bar provided with a salient and which controls, by means of this salient, the ratchet members connecting said driving bar to the horizontal bars of the driving slide, in such a manner that the transfer bar moves the desired stop bar only after the coupling bar has caused the coupling or uncoupling of the ratchets and horizontal arms.

An embodiment of a machine according to the invention and the operation thereof are described more in detail hereinafter, reference being made to the appended drawings which give a diagrammatic illustration of a machine according to the invention and in which:

Figs. 1 and 1a together are general views of the machine represented by a lateral section on the line I—I of Fig. 20;

Figs. 2 and 2a are general views of the machine represented by a section parallel to that of Figure 1, but in a plane passing through the middle of the machine;

Fig. 3 is a partial lateral view representing the driving members which relate to the engagement of the counting units, on the line III of Fig. 20;

Fig. 4 is a lateral section on the line IV—IV of Fig. 20 and showing the selecting members of the counting units and of the functions;

Fig. 5 is a partial horizontal section representing the rectilinear counting units of the machine on the line V of Fig. 2;

Fig. 6 is a lateral view on the line VI of Fig. 20 showing the clutching members relating to the engagement of the counting units;

Fig. 7 is a partial horizontal section on the line VII of Fig. 2 showing the driving members of the slides and of the transfer of tens;

Fig. 9 is a partial lateral section on the line IX of Fig. 26, showing a detail of a transfer bar;

Fig. 10 is a partial lateral section on the line X of Fig. 26, showing a detail of a mobile angle member;

Fig. 11 is a partial lateral section on the line XI of Fig. 26, showing a detail of a clutching bar;

Fig. 12 is a front section of a row of the keyboard;

Fig. 13 is a detailed lateral view of a key;

Fig. 14 is a horizontal section of the driving mechanism of the carrier on the line XIV of Fig. 16;

Fig. 15 is a view of the drive of the carrier on the line XV of Fig. 1;

Fig. 16 is a side view of the drive of the carrier;

Fig. 17 is a plan view of the drive of the carrier, the cover having been removed;

Fig. 18 is a view of the drive of the carrier on the line XVIII of Fig. 16;

Fig. 19 is a diagrammatic schematic table showing the seven phases in which all the functions of the machine as described are grouped;

Fig. 20 is a partial section on the line XX of Fig. 4 showing the selecting members of the counting units and of the functions of the machine;

Fig. 21 is an elevational view from the rear of one row of the keyboard;

Fig. 25 is a detailed view from above of a part of the transfer control mechanism;

Fig. 26 is a similar view of a part of said transfer control mechanism at a still larger scale;

Figure 1:
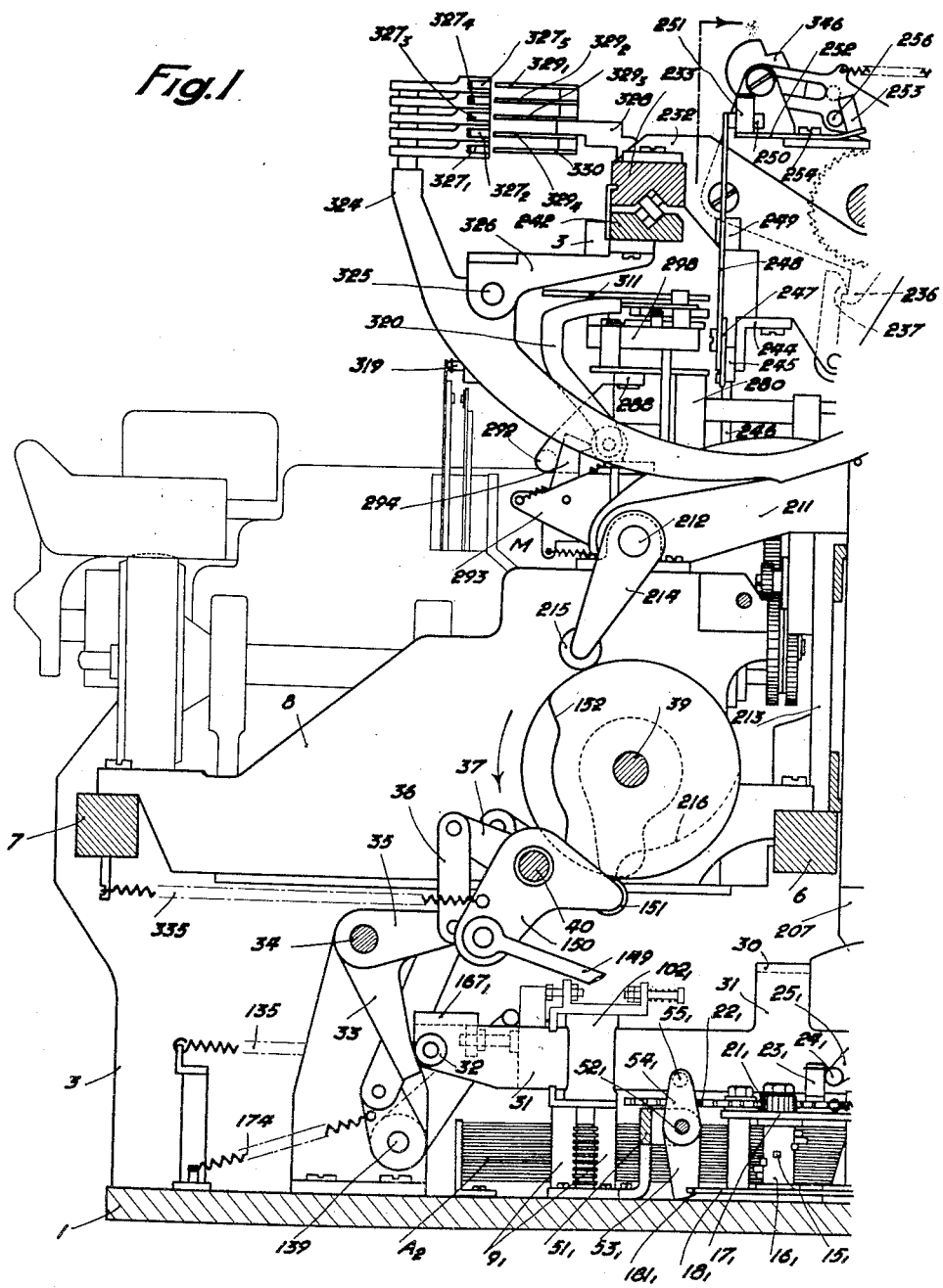
Figure 1A:
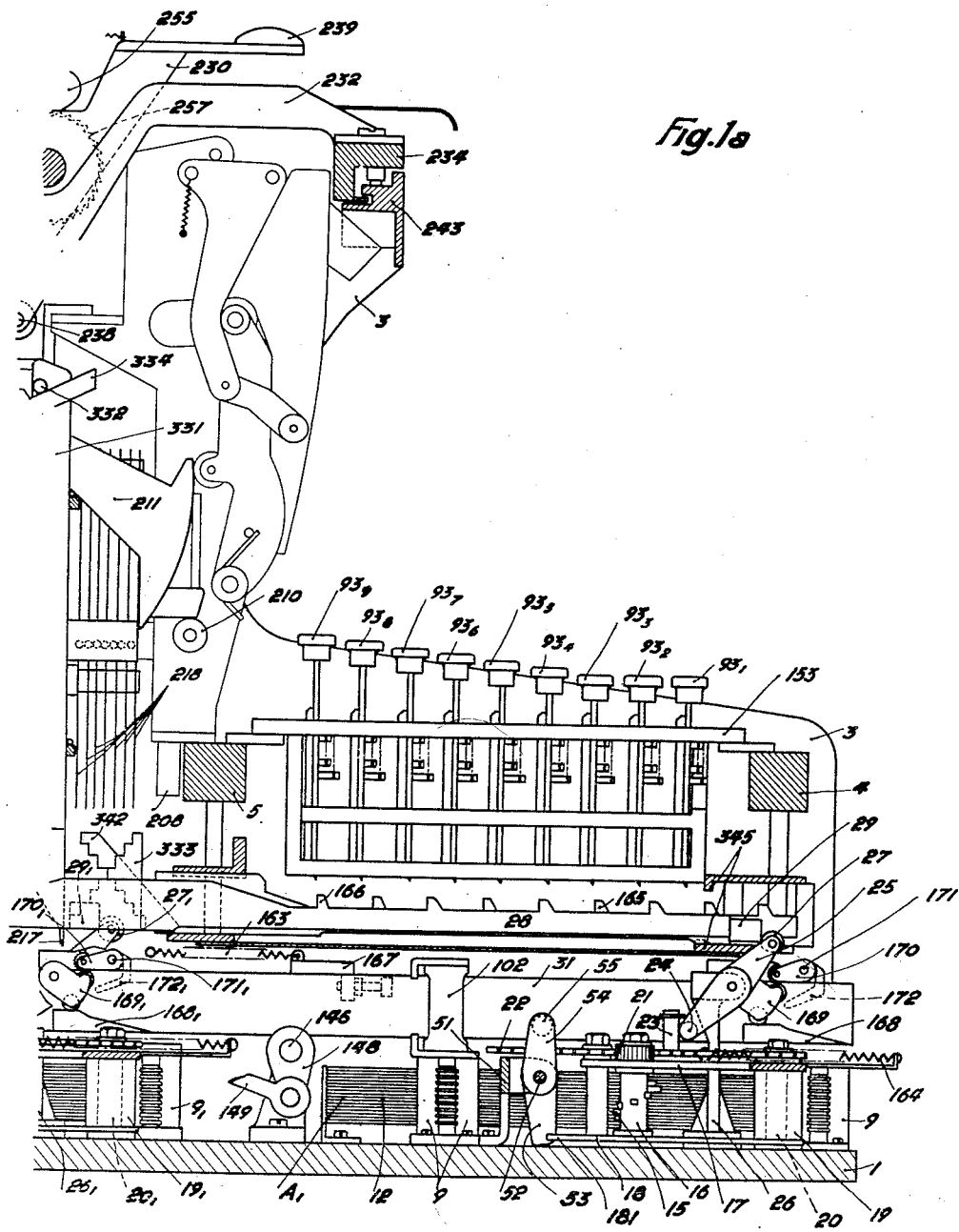

The machine as shown comprises a frame formed of a bottom plate 1 fast with two right and left flanges 2 and 3, connected by square struts 4, 5, 6 and 7, and an intermediary flange 8 maintained by said square struts 6 and 7. On said frame are fixed all the mechanical elements of the machine, which are hereafter described.

The machine comprises (Figs. 1 and 5) two counting sections $A_1$ and $A_2$, each including a certain number of counting units, said sections being hereafter respectively called "front section" and "rear section" for sake of simplicity. In the following description and in the drawings, reference numerals without an index refer to the front section $A_1$ and, generally to the corresponding control members, whereas reference numerals provided with index 1 refer to the rear section $A_2$ and, generally to the corresponding control members.

Each section comprises vertical rack posts 9 and $9_1$ (Figs. 1 and 2) mounted on plate 1 and provided with slots for slidably holding bars 10 and $10_1$ (Fig. 5) which are provided with studs 11 and $11_1$, such as described in my above mentioned U. S. Patent No. 2,562,172. Said studs 11 and $11_1$ act as guides for slides 12 which are adapted to move perpendicularly to bars 10, $10_1$. Flat, triangular members 13, $13_1$ are also slidably mounted in vertical racks 900 and $900_1$, and the ends of said members engage studs 14 and $14_1$ provided on bars 10, $10_1$.

Springs 64 and $64_1$ maintain bars 10 and $10_1$ by pressing upon them (Fig. 5) so as to lock slides 12 by means of locking angle-bars 65 and $65_1$ which cooperate with teeth provided on one side of slides 12. Said locking action continues as long as the corresponding counting unit has not been selected.

In each section $A_1$ or $A_2$, there are ten piled up frames, hereafter called counting frames, formed of two bars 10 or $10_1$, carrying five slides 12 and $12_1$, each corresponding to one order of numeration, and one triangular member 13 and $13_1$.

Two shafts 16 and $16_1$ are rotatively mounted in upper plates 17 and $17_1$ and lower plates 18 and $18_1$ which are held parallel by means of sleeves 19 and $19_1$ (Figs. 1 and 4) on which they are secured, said sleeves being rotatably mounted on trunnions 20 and $20_1$ (Fig. 1) secured on plate 1. Said shafts 16 and $16_1$ are provided with ten laterally extending pins 15, $15_1$, helically arranged around said shafts in such a manner that each pin 15, $15_1$ is on the same level as a nose 180, $180_1$ provided on each triangular member 13, $13_1$.

Pinions 21 and $21_1$ are fixed on shafts 16 and $16_1$ (Fig. 20) and cooperate with racks 22 and $22_1$ mounted on the upper plates 17 and $17_1$, by means of longitudinal slits engaged on the end of trunnions 20, $20_1$ and on trunnions secured at the opposite ends of plates 17, $17_1$. These racks are permanently drawn towards the front of the machine by springs 164 and $164_1$, the other ends of which are secured on the plates 17 and $17_1$ (Figs. 1, 4 and 20).

The said racks 22 and $22_1$, slidably mounted above the plates 17 and $17_1$, are provided with rollers 23 and $23_1$ which cooperate with fingers 24 and $24_1$, fast with lever-arms 25 and $25_1$ (Fig. 1) and rotatively mounted on two supports 26 and $26_1$ fast with plate 1; the upper arms of said levers 25 and $25_1$ are provided with rollers 27 and $27_1$ which cooperate with salients 29, $29_1$ provided laterally on stop bars 28 and $28_1$. Said stop bars 28 and $28_1$ (Figs. 1 and 8) slide in grooves provided inside a frame 345 rigidly connected to the struts 4 and 5.

As above mentioned, springs 164 and $164_1$ act upon racks 22 and $22_1$, drawing said racks and the rollers 23 and $23_1$ which are carried thereby towards the front of the machine. Said rollers 23 and $23_1$ act upon levers 25, $25_1$ and, in turn, the rollers 27, $27_1$, acting upon the lateral salients 29, $29_1$ of stop bars 28, $28_1$, tend to drive said bars towards the rear of the machine. Said stop bars 28, $28_1$ abut against a cross bar 30 rigidly connected at its respective ends with two parallel bars 31 and $31_1$ slidably mounted, on each side of, and above the units $A_1$ and $A_2$, in vertical guides 102, $102_1$ respectively carried by the vertical rack posts 9 and $9_1$. Bars 31 and $31_1$ are acted upon by springs 163 which tend to pull said bars towards the rear of the machine, this movement being opposed by the abutment of rollers 32, $32_1$, carried by the rear part of said bars 31, $31_1$, against levers 33 and $33_1$ (Figs. 1, 2, 23 and 25). Said levers 33 and $33_1$ are keyed on shaft 34 on which is secured an arm 35 connected by a rod 36 to a lever 37 rotatably mounted on a shaft 40 the ends of which are respectively secured to flanges 2 and 8 of the machine. Said lever cooperates with a cam 38 keyed on a shaft 39 rotated by the motor M of the machine, by means of well known self-clutching and unclutching system E, such as, for example, that described in my above mentioned U. S. Patent No. 2,562,172 and visible in Fig. 2.

Sliding bars 31 and $31_1$, in addition to the cross-bar 30 hereabove mentioned, are provided with angle bars 167 and $167_1$ (Figs. 2, 23 and 25) carrying stops 66 and $66_1$, one for each numeration order, the functions of said stops being hereafter explained.

Bars 31 and $31_1$ are provided with slopes 168 and $168_1$ (Figs. 1, 23 and 25) laterally secured on said bars 31, $31_1$. Levers 169 and $169_1$ mounted for rotation on plates 1009, which are secured to guides 101 and $101_1$ carried by the vertical rack posts 9, $9_1$, cooperate with said slopes by means of a roller. The slopes 168 and $168_1$ are inclined in such a manner that they raise said levers 169 and $169_1$ during the movement of return of bars 31, $31_1$ towards the rear of the machine. Levers 169 and $169_1$, when raised, also cooperate, by means of rollers, with shafts 170 and $170_1$ which are fast with shafts 171 and $171_1$ mounted for rotation on said plates 1009. Shafts 171, $171_1$, which extend along the whole width of the machine, are provided with fingers 172 and $172_1$ (see also Figs. 9, 11 and 24) the operation of which is thereafter explained.

Figure 27:
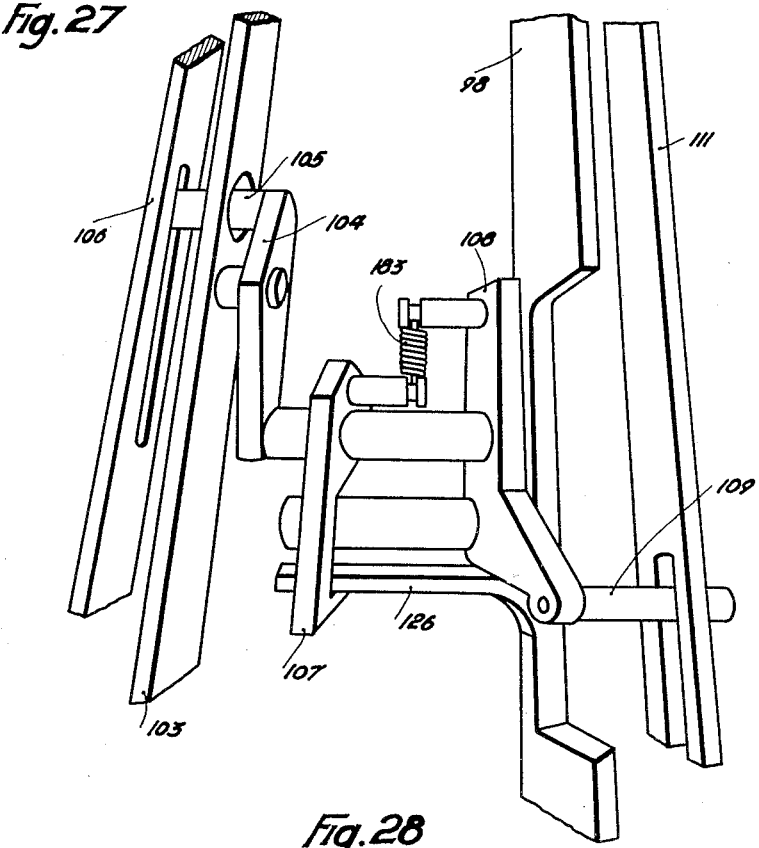
Fig. 27 is a diagrammatic, perspective view of a part of the same mechanism.

On an extension of plates 17 and $17_1$ are rotatably mounted rollers 41 and $41_1$ (Figs. 4 and 20) on the axle of which are hooked springs 42 and $42_1$ (Figs. 3, 6, 20, 22) secured at their other ends, on slides 43 and $43_1$, provided with bent ends 44, $44_1$ which are applied by said springs on rollers 41, $41_1$. Said slides 43 and $43_1$ are respectively slidably mounted on a bar 45, which is also slidably mounted on flange 2. Springs 46 and $46_1$ are hooked at one of their ends on flange 2 and at their other ends to slides 43 and $43_1$ and tend to drive said slides 43 and $43_1$ towards the front of the machine. A lever 48 (Fig. 3) maintains bar 45 rearwards, said bar acting against springs 46 and $46_1$ by means of a roller 47 fixed onto said bar 45. Lever 48 is rotatively mounted on shaft 40 and carries a roller 49 which operates with a cam 50 keyed on shaft 39. On shafts 52 and $52_1$ rotatively mounted on supports 51 and $51_1$ (Figs. 1, 4, 20 and 27) are keyed arms 53 and $53_1$ which are adapted to lock the lower plates 18 and $18_1$ in one direction or in the other by acting on the noses 181 and $181_1$ of said plates 18 and $18_1$ (Figs. 1 and 27), either when said plates 18 and $18_1$ are under the action of springs 46 and $46_1$ or when said plates 18 and $18_1$ are under the action of springs 42 and $42_1$ (Figs. 1, 3, 4, 20, 28), according to the position of cam 50 which determines whether or not lever 48 will displace bar 45 submitted to the action of springs 46 and $46_1$. On shafts 52 and $52_1$ are moreover keyed arms 54 and $54_1$, carrying rollers 55 and $55_1$ arranged for cooperation with sliding-bars 56, 67, 68 (Figs. 4, 6 and 20) mounted on guides 57 and $57_1$ solid with plate 1.

Bar 56 is held towards the rear of the machine against a stop 59 by means of a spring 58. Upon the rear of said bar 56 acts a roller 60 carried by a lever 61 rotatively mounted on shaft 40 and having an upper arm 62 provided with a nose capable of cooperating alternately with teeth $63_1$ and $63_2$ provided on a cam 63 fast with shaft 39 (Fig. 6).

Bars 67, 68, 69 which also slide on guides 57 and 57₁ are drawn rearwards by means of springs 70, 71 and 72 (Figs. 4 and 20). Bars 67 and 68 each carry, at one of their ends, two rocking levers 73, 74 and 73₁, 74₁, whereas bar 69 is provided with only one rocking lever 75 (Figs. 4 and 20). All these levers are pulled upwards by means of springs 76. These different levers are of an identical shape, except for levers 74 and 74₁ which extend in an upper arm 77 (Fig. 4). A lever 78 (Fig. 4) is rotatively mounted on shaft 40 and carries a roller 79 which cooperates with a cam 80 keyed on shaft 39. A plate 81 is rigidly connected to the lower arm of lever 78 and the dimensions of this plate are so chosen as to allow it to press at the same time upon all levers 73, 73₁, 74, 74₁ and 75 (Figs. 4 and 20) against the action of spring 76, when said lever 78 is released by cam 80 and plate 81 is pulled towards the rear of the machine by a spring 168 (Fig. 4).

A plate 82 (Figs. 4 and 20) is slidably mounted in a guide 83 secured on the base plate 1 of the machine and is under the action of a spring 84 which causes the said plate to be pulled towards the right hand side of the machine.

A groove 85 is provided in plate 82 in order that only one nose 86 of one of the levers 73 to 75 may pass through plate 82, according to the sliding position of said plate. On a vertical shaft extending from the base plate 1 of the machine is rotatively mounted a two-armed lever 87, one arm of which carries a roller 88 entering a suitable groove provided in plate 82. The other arm of said lever 87 carries a second roller 89 which cooperates with an extension 90 of a stop bar 91 (Figs. 4, 8 and 20) slidably mounted in the above mentioned frame 345.

As in my prior U. S. Patent No. 2,562,172, a keyboard is provided for the control of the machine, which comprises three different series of keys, viz. one row of six keys 92₁ through 92₆, two parallel rows of nine keys 93₁ through 93₉, and four rows of nine keys 114 (Figs. 1, 2, 4 and 22).

The keys in the right and left hand rows of keys 93₁ to 93₉, which are adapted to be depressed and held in depressed position as will be described hereafter in connection with keys 114, respectively cooperate, when depressed, with teeth 165 provided on the stop bar 28₁ and with teeth 166 provided on stop bar 28, the right hand row of keys 93, the front controlling counting section A₁ and the left hand row, the rear controlling counting section A₂, each key in one row corresponding to one of the counting frames in the corresponding section.

In order to select a given counting frame or counter in a counting section A₁ or A₂, for the purpose of registering calculation data in said counter, the operator depresses one of keys 93₁ to 93₂ on the left or right hand row of keys, respectively, which corresponds to the frame which is to be selected in the corresponding section. The motor is then started and shaft 39 is driven by the self-clutching and unclutching device.

In considering Figure 3, it may be seen that cam 50, keyed on shaft 39, will exert a pressure upon roller 49, thus causing lever 48 to rock around shaft 40, which lever will, in turn, exert a pressure upon roller 47, causing bar 45 to slide towards the rear of the machine, thus driving, in the same direction, the slides 43 and 43₁ against the action of springs 46 and 46₁. Springs 42 and 42₁ are thus tensioned and pull on supporting plates 17 and 17₁.

However, said support plates 17 and 17₁ will be prevented from rocking, since the other parallel support plates 18 and 18₁ (Figs. 1, 4 and 20) are locked by locking members 53 and 53₁.

Figure 2A:
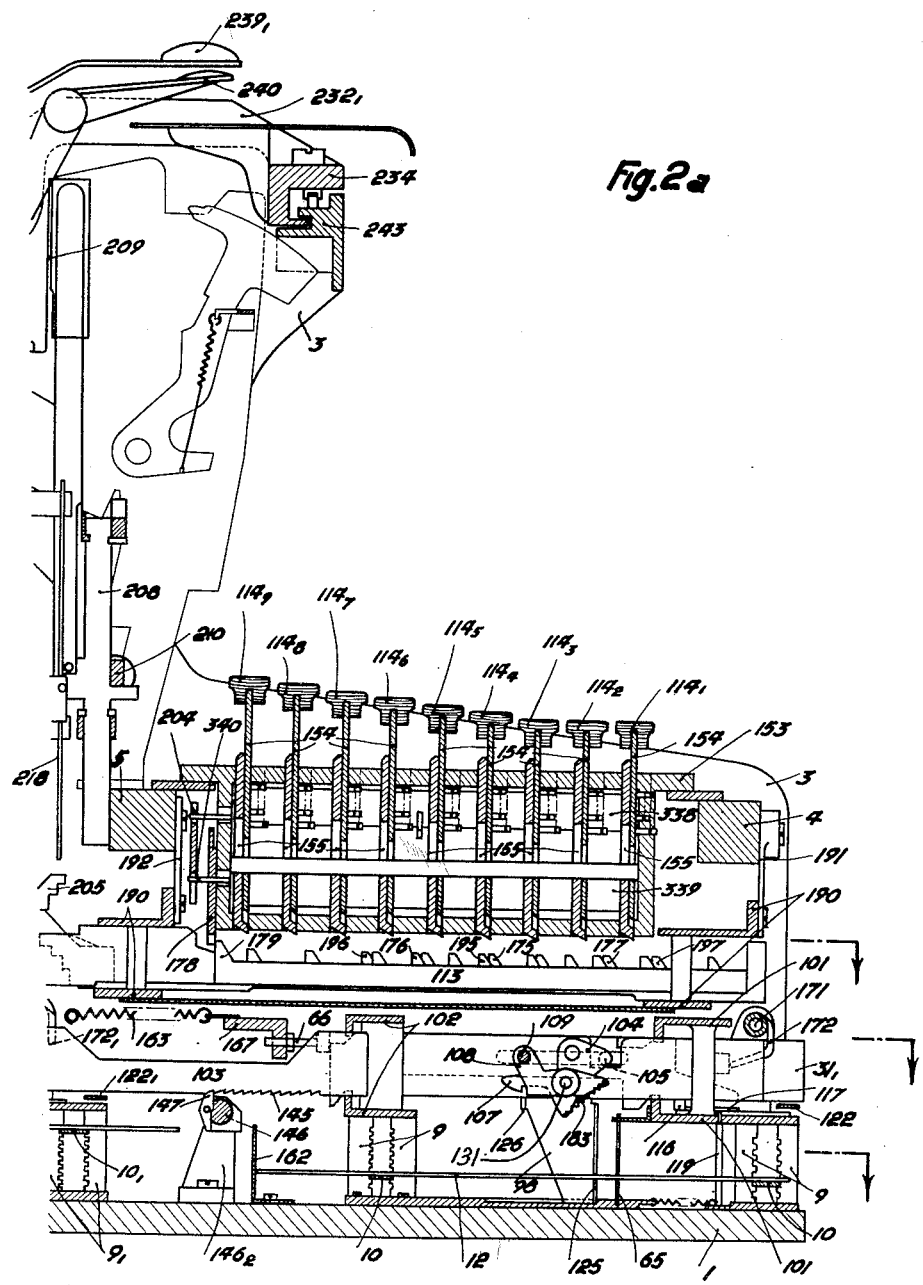

At the same time, cam 38 (Figs. 2 and 23) will release lever 37, which allows the movement of rod 36, lever 35 mounted on shaft 34 and levers 33 and 33₁, whereby bars 31 and 31₁ will slide towards the rear of the machine, under the action of springs 163 (Figs. 1 and 2).

Cross bar 30 (Figs. 1, 2 and 23) will also move backwards, thus releasing the ends of stop bars 28, 28₁, respectively, which are now free to move also toward the back of the machine.

As above described, springs 164 and 164₁ respectively pull frontwards the racks 22 and 22₁ which carry fingers 23, 23₁ acting upon levers 25, 25₁. The said levers therefore tend to rock and push stop bars 28, 28₁, by means of rollers 27, 27₁ and salients 29, 29₁. The said bars 28, 28₁ will therefore move toward the back of the machine, but their movement will be stopped when a tooth 165 or 166 of said bars 28, 28₁, come to butt against the rod of the key 93 which has been depressed in the corresponding row.

At the same time, racks 22, 22₁, cause corresponding pinions 21, 21₁, respectively keyed on shafts 16, 16₁, to rotate, as long as stop bars 28, 28₁ move towards the back of the machine. The diameter of said pinions and the position of teeth 165 and 166 on stop bars 28, 28₁ are predetermined in order that, when a key 93 has been depressed in each row, and the machine started, the corresponding, possible backward movement of stop bars 28, 28₁, and therefore the frontward movement of racks 22, 22₁ causes such a rotation of shafts 16, 16₁ that the fingers 15, 15₁ carried by said shafts, which are at the level of the counting frames corresponding to the keys which have been depressed, are brought in front of the noses 180, 180₁ of the triangular members 13, 13₁ of said counting frames.

The preparation for selecting the counting frames is thus operated. The unlocking of slides 12 corresponding to said counting frames, as well as their engagement with driving and calculating means, will now be described:

When shaft 39 continues its rotation (Fig. 6), tooth 63₁ of cam 63 is engaged under the nose of lever 62, driving lever 61 which, by means of roller 60 causes bar 56 to slide towards the front of the machine, against the action of spring 58.

Bar 56 will simultaneously exert a pressure upon rollers 55 and 55₁, thus unlocking plates 18 and 18₁ through rotation of levers 53, 53₁ (Figs. 1, 4, 6 and 27). At this moment, the units composed of plates 17 and 17₁, 18 and 18₁, and shafts 16 and 16₁ provided with fingers 15 and 15₁, will rock about shafts 20, 20₁ (Fig. 20) under the action of springs 42 and 42₁ (Fig. 3) and fingers 15 and 15₁ which are opposite triangles 13 and 13₁ (Fig. 5) corresponding to the selected counting frame, will exert a pressure on said triangles.

Bars 10 and 10₁ will slide, against the action of springs 64 and 64₁, thus releasing slides 12 from the locking bars 65 and 65₁ and engaging said slides 12 with driving and calculating means 98 and 98₁ (Figs. 5 and 2) hereafter described.

In the above mentioned guides 101, 102 and 101₁, 102₁, carried by the rack posts 9 and 9₁, are slidably mounted driving bars 103 (Figs. 2, 7 and 24) in equal number to that of the slides 12, each bar 103 corresponding to one order of numeration, and extending over the two sections A₁ and A₂. Transfer bars 106, 106₁ are also slidably mounted in said guides 101, 102 and 101₁ and 102₁, respectively, one bar 106 and one bar 106₁ being arranged alongside each bar 102. On said bars 103 are rotatively mounted triangular levers 104 and 104₁ (Figs. 2, 7, 24 and 26), respectively corresponding to sections A₁ and A₂ and provided at the end of their horizontal arms with studs 105 and 105₁, which pass through openings provided in the corresponding driving bar 103 and engage in grooves provided in the transfer bars 106 and 106₁ (Figs. 7, 9 and 26) arranged alongside said driving bar 103. Said transfer bars 106 and 106₁ are under the action of springs 110, 110₁ which tend to pull said bars towards the front of the machine, and said bars are provided with slopes 100, arranged at an appropriate angle, for instance of 45° which cooperate with guides 101, 102 and 101₁, 102₁ to determine an upward movement of bars 106, 106₁, when said bars move under the action of springs 110 and 110₁. On a trunnion 131, 131₁ carried at the end of the vertical arm of each of the triangular levers 104 and 104₁ are rotatably mounted ratchets 107 and 107₁ and counterratchets 108 and 108₁ united by means of springs 183, 183₁. The counterratchets 108 and 108₁ (Fig. 2) are provided with a stud 109, 109₁ entering grooves of the unlocking bars 111 and 111₁ (Fig. 11) which are slidably arranged in guides 101, 102 and 101₁, 102₁ (Figs. 7, 25 and 26). These unlocking bars are provided with slopes 100 identical to those of bars 106 and 106₁ hereinabove mentioned, in order to determine a parallel upward movement of said unlocking bars 111 and 111₁ when said bars move towards the front of the machine under the action of springs 112 and 112₁.

All unlocking bars 111, 111₁ with the exception of that which lies on the left hand side of guides 101, 102 and 101₁, 102₁ are provided with a lateral salient 115, 115₁ adapted to butt against the forward end of the transfer bars 106, 106₁ which lies respectively alongside said bars 111, 111₁ (Figs. 7, 11 and 26). Each of said bars 111, $111_1$ is also provided with a downward extension 116, $116_1$ capable of engaging with the nose of a stop member 117, $117_1$ adapted to lock the corresponding bar 111, $111_1$ and, therefore, the adjacent bar 106, $106_1$ against movement towards the front part of the machine. Stop members 117, $117_1$ are respectively mounted on guides 101, $101_1$ and are each provided with a groove in which there engages a stud 118, $118_1$ arranged at the upper end of a wing 1119, $1119_1$ extending laterally along a disengaging shaft 119, $119_1$ (Figs. 2, 5, 7 and 26). There is provided one shaft 119, $119_1$ for each bar 111, $111_1$, all said shafts being rotatively mounted, on the one hand, on frame 1, and on the other, on guiding plate 101, $101_1$, and extending respectively through the counting sections $A_1$ and $A_2$, on one side of each pile of slides 12 in said sections. Said slides 12 (Fig. 5) are each provided with a dent 120 adapted to come into abutment with the lateral wing 1119, $1119_1$ of the corresponding shaft 119, $119_1$ when said slides 12 reach their extreme position towards the front of the machine, and to cause thereby the rotation or tilting of shafts 119, $119_1$. Stop member 1117 (Fig. 7) at the extreme right, which is identical with stop members 117, except that it does not cooperate with a shaft 109, as well as the stop member 117 at the extreme left are provided with a supplementary arm 121 and $121_1$, said arms being connected together by a rod 122 (Fig. 7).

Transfer bars 106 and $106_1$ on the extreme right do not cooperate with unlocking bars but are provided with a nose 123 the movement of which is limited by stop member 1117 on the extreme right. Consequently, when a slide 12 belonging to the highest order of numeration (on the left) reaches its most forward position and causes the corresponding disengaging shaft 119 to tilt, it thereby tilts the corresponding stop member 117 which disengages the extension 116 of the corresponding unlocking bar 111, said bar being free to move towards the front of the machine under the action of the corresponding spring 112. At the same time, the stop member 117 on the other side, which is connected to the above mentioned stop member 117 by rod 122, is also tilted and disengages nose 123 of the corresponding transfer bar 106, which corresponds to the lowest order of numeration, said bar being free to move towards the front of the machine under the action of the corresponding spring 110.

In guides 101, 102, $101_1$ and $102_1$, slide mobile angle member 98 and $98_1$ (Figs. 2, 5, 7, 10 and 26), a bent edge 125 of which cooperates with slots provided on the right side of slides 12 when said slides are displaced from left to right under the action of the selecting and engagement members hereinabove mentioned. Said mobile angle members 98 and $98_1$ are also provided on one hand with a finger 126 and $126_1$ cooperating with ratchets 107, $107_1$ and counterratchets 108 and $108_1$ (Fig. 24) and on the other hand with a stop 127, $127_1$, the operation of which will be explained hereafter.

Springs 128 and $128_1$ are fixed, on the one hand, to each of the mobile angle members 98, $98_1$ by a hook 129, and, on the other, to the end of a rod 130 which is rotatively mounted on shaft 131 of the adjacent ratchets and counter-ratchets 107 and $107_1$, 108 and $108_1$. Said rod is guided by a stud 132, entering a groove arranged in the mobile angle members 98, $98_1$ (Fig. 7). Rod 130 has for its only function to tension springs 128 and $128_1$, in order that they should have a correct length.

In guides 101, 102, $101_1$, $102_1$ are also slidably mounted five driving bars 103 (Figs. 2, 7, 24, 25 and 26) which extend over both sections $A_1$ and $A_2$. Said bars are permanently maintained rearwards under the action of springs 135, one end of which is hooked to a cross-bar 136 fast with a support $136_2$ which is fast with plate 1, while the other is hooked on the corresponding bar 103. Rollers 137 are mounted on levers 138 (Figs. 2 and 24) keyed on a shaft 139 in bearings fixed to plate 1. A lever 140 is fast with shaft 139 and is connected by a rod 141 to a lever 142. The lever 142 may also rotate around shaft 40 and is provided at its end with an antifriction roller 143 cooperating with a cam 144 keyed on shaft 39. Said roller 143 will or will not be under the action of cam 144 according to the rotation of shaft 39. If said roller 143 cooperates with cam 144, all of the driving bars 103 are brought back to their normal position, i. e. to their resting position towards the front of the machine, but if, on the contrary, roller 143 and consequently, rod 141 are not under the action of cam 144 driven by shaft 39, said bars 103 will be directly under the action of springs 135 and free to move towards the back of the machine. Said driving bars 103 are provided with saw teeth 145 and a play compensating shaft 146 is rotatively mounted in supports $146_2$ solid with plate 1. On this shaft are rotatively mounted ratchets 147, one for each numeration order.

A lever 148 is keyed on shaft 146 and said lever 148 (Fig. 1) is connected by a rod 149 to a lever 150 rotatively mounted on shaft 40. Said lever 150 is provided with a roller 151 which cooperates or not with a cam 152 keyed on shaft 39. If roller 151, and therefore lever 150 cooperate with cam 152, ratchets 147 will determine the correct position of driving bars 103, which are acted upon, on another hand, by springs 135.

On the keyboard, four rows of nine keys 114 (Figs. 2, 22) indicated by reference numerals $114_1$, $114_2$, $114_3$, $114_4$, $114_5$, $114_6$, $114_7$, $114_8$, $114_9$, are mounted on the upper part of stems 154 sliding inside frames 153, one frame being provided for each numeration order (Figs. 2, 12, 13 and 21). Vertical sliding bars 155 are mounted parallel to stems 154 and are each provided with a stud 156, said stud passing through a slot in the adjacent stem 154 and serving as a hooking point for a spring 157 hooked, at its other end, upon another stud 158 fast with said adjacent stem 154. Alongside each key stem a spring 159 is hooked, at one of its ends, on to frame 153 and, at its other end, on to a stud 160, which is also fast with rod 154.

Immediately beneath each row of keys 114 a stop bar 113 is slidably mounted in guides 190. A finger 134 protrudes laterally of the rear end of each bar 113, which finger engages a groove provided in a vertical extension 133 of the driving bar 103 which lies immediately beneath the considered bar 113. The upper side of each bar 113 is provided with a series of teeth adapted to cooperate with the vertical bars 155 of the keys 114 of the corresponding row of keys when said keys are depressed and bar 133 moves towards the back of the machine.

When the operator depresses a key 114, which is then held downward as will be explained hereafter, stem 154 fast with said key follows the downward movement and spring 157 will also drive the corresponding vertical bar 155 downwards. When the corresponding driving bar 103 moves towards the back of the machine under the action of spring 135 attached thereto, the corresponding stop bar 113, which is made fast with said bar 103 by means of the extension 133 thereof and the finger 134, also moves in the same direction but is stopped in said movement by abutment of a tooth of said bar 113 with said vertical bar 155 of the depressed key 114. While the machine operates through its cycle, and during the rotation of shaft 39 and before stop bar 113 have returned to their extreme position towards the front of the machine, the operator may depress another key. Nothing will prevent said stop bars 113 from returning. The teeth of corresponding stop bar 113, which must pass under the previously depressed vertical bar 155, will act upon the beveled lower end 161 of said vertical bar 155 and push said bar upwards against the action of spring 157.

As soon as the tooth has gone by and stop bars 113 have been driven by rollers 137 to their extreme position, the vertical bar 155 will come down again and will therefore again be ready to play its normal part of a stop for the next operation.

On the vertical sides of the keyboard frames 153 are rotatively mounted flaps 336 to maintain stems 154 in a downward position in cooperating with inclined notches 337, which are provided in said stems. A cross-bar 338 slidably mounted across frames 153 is provided with large notches 338 (Fig. 12) which cooperate with the flaps 336 for causing said flaps to tilt after each recording in order to release all rods 154 which have been depressed by the operator. Transverse movement of bar 338 is caused by cams and rods not represented in the drawings. Other flaps 339 are mounted in the same way as flaps 336 and each carries a stud 340 adapted to cooperate with a zero finger 178 capable of rocking on a trunnion fixed onto the corresponding frame 153. When a stem 154 is depressed, flap 339 which corresponds to said stem tilts over, thereby driving and tilting the corresponding zero finger 178. It should be remarked that if the said zero fingers 178 are not tilted, said fingers lock all stop bars 113 by engaging zero teeth 179 (Fig. 2) carried by said stop bars.

A bar 341 (Figs. 12 and 13) is fixed to the vertical sides of frame 153 and has for its object to limit upward and downward movement of stems 154.

All the members which have been hereabove described will be hereinafter further described with more detail together with other members which have not been mentioned. In order to facilitate the understanding of the following description, the operation of said members in relation to the various functions which the machine according to the present invention is to perform will also be described and concrete examples will be given.

*Addition*

Addition may be simultaneously carried on in a counting frame or unit belonging to one section and in another counting unit belonging to the other section of the machine.

Operator depresses keys 93 corresponding to the counting units in which the addition is desired, as well as keys 114 for the composition of the amount to be added, thereby choosing the row which corresponds to the numeration order of each given figure. Operator then acts upon the control of the motor in order to start said motor, which determines a complete revolution of shaft 39 as well as of all cams fast with said shaft, thus originating operations which will be described hereunder.

As an example, it will be supposed that the operator depresses key $93_4$ of the row of keys 93 corresponding to the front section $A_1$ of the machine and key $93_5$ of the row of keys 93 corresponding to the rear section $A_2$ of the machine, as well as key $114_2$ of the first row of keys 114 from the right of the keyboard, which corresponds to units, key $114_7$ in the second row, which corresponds to tens, and key $114_5$ in the third row, which corresponds to the hundreds, the amount which is to be added being "572," and the selected counting units being unit No. 4 in the front section and unit No. 9 in the rear section. It will also be supposed that due to a previous operation of the machine, the three right hand slides 12 of said unit No. 4 of the front section have been brought to positions in which the eighth notch, counting from the rear of the machine, in the first slide at the extreme right, engages with the corresponding angle member 65, and the second notch in the second slide and first notch in the third slide engage the respective, corresponding angle members 65, this meaning that the said unit has registered the amount "128." In the same manner, the said counting unit No. 9 of the rear section will be supposed to have registered the amount "312." All other slides of the two mentioned counting units are in a position which corresponds to zero, i. e. in their extreme position towards the rear of the machine, in abutment with stop plates 162 and $162_1$ fixed on plate 1.

The distance between two notches of a slide 12, which cooperate with the angle members 65, $65_1$, is hereafter referred to as "pitch."

*Phase I.—Selection of the function and of the counting units.*—Under the action of the motor, which has been started, shaft 39 starts its revolution, driving cam 38 (Figs. 2, 23 and 25) which releases lever 37, so that bars 31 and their cross-bar 30, under the action of springs 163, releases stop bars 91, 28 and $28_1$ (Figs. 1 and 4). At this moment, stop bar 91 will be driven towards the rear of the machine under the action of spring 84 (Figs. 4 and 20) and that of cooperating members 82, 87 and 90. Since operator has not depressed any function key 92, stop bar 91 (Fig. 4) will slide freely until it has reached its extreme position towards the rear of the machine and plate 82 provided with groove 85 will also slide until it has reached its extreme position towards the right hand side of the machine, covering levers 73, $73_1$, 74, $74_1$ and 75 which are thus prevented from rising.

Simultaneously, stop bars 28 and $28_1$ (Fig. 1) will tend to slide towards the rear of the machine under the action of springs 164 and $164_1$, and that of levers 25 and $25_1$ as has been previously described.

The operator having depressed keys $93_4$ and $93_9$ of front and rear section of the machine, stop bar 28 will move only until its tooth 165 comes to butt against the stem of key $93_4$, while stop bar $28_1$ will be similarly stopped in its movement by cooperation of its tooth 166 with the stem of key $93_9$ (Fig. 1).

In these conditions, the disposition of the selecting members already mentioned, will bring about the cooperation of salients 29 and $29_1$, engaging rollers 27 and $27_1$ with levers 25 and $25_1$ which, by means of rollers 24 and $24_1$ drive racks 22 and $22_1$, shafts 16 and $16_1$ and fingers 15 and $15_1$, so that, in the front section of the machine, a finger 15 will be opposite triangle 13 corresponding to counting unit No. 4, whereas in the rear section of the machine, a finger 15 will be opposite triangle 13 corresponding to counting unit No. 9.

Figure 24:
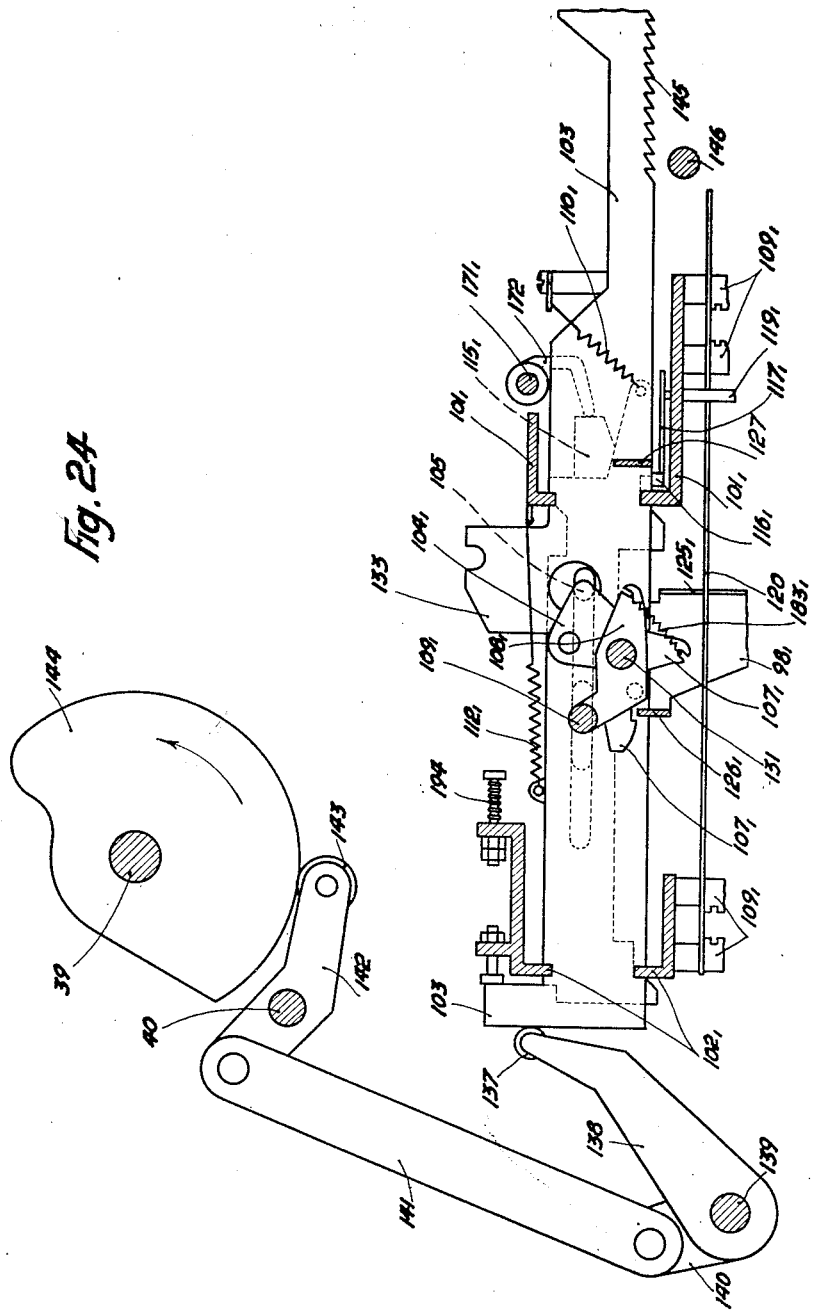
Fig. 24 is a similar view of a driving bar of the transfer control mechanism.

*Releasing of mobile angle members and transfer slopes.*—As illustrated at Figs. 2, 23, 24 and 25 and as above described, bars 31 are provided with cross angle members 167 and $167_1$ which carry stops 66, $66_1$ in abutment with the rear ends of angle members 98 and $98_1$ provided with the locking fingers 126 and $126_1$, which cooperate with ratchets 107 and $107_1$ as above described (Fig. 24). At the considered moment of the cycle of the machine, the bars 31 having moved towards the back of the machine, together with the cross angle members 167 and $167_1$ and the stops 66, $66_1$ carried thereby, the mobile angle-members 98, $98_1$ are free to move towards the back of the machine.

The rearward movement of bars 31 causes a movement of slopes 168 and $168_1$ (Figs. 1 and 23) which liberate levers 169, $169_1$, 170 and $170_1$ thus allowing shafts 171, $171_1$ to rotate counterclockwise under the action of springs 173, $173_1$, driving the rake-shaped members 172 (Figs. 9 and 11). In the normal, downward position each tooth of the rake-shaped members 172, $172_1$ exerts a pressure on salient 115, $115_1$ of a bar 111, $111_1$. It will be further explained that all bars 111 and $111_1$, as well as transfer bars 106 and $106_1$ will freely slide frontwards under the action of the respective springs 110 and $110_1$ or 112 and $112_1$, as soon as corresponding stop member 117 and $117_1$ has been withdrawn by release shaft 119.

*Preparation of the engagement.*—Together with above-mentioned movements, the preparation of engagement of account counting units is operated in the following manner:

Cam 50 exerts a pressure on roller 49 (Fig. 3) which tilts lever 48 then cooperating with roller 47 in order to drive engagement bar 45, thus pulling springs 46 and $46_1$ as well as springs 42 and $42_1$.

However, rollers 41 and $41_1$, as well as plates 17 and $17_1$, do not follow this movement, since locking members 53 and $53_1$, according to the above explanation, maintain plates 18 and $18_1$ (Fig. 1), which are fast with plates 17 and $17_1$, in their locking position.

*Second phase.—Function control.*—Shaft 39 continuing its rotation, cam 80 (Fig. 4) engages roller 79, thus rocking lever 78 against the action of spring 168.

Plate 81, in the at rest position of the machine plays the part of a stop for levers 73, 74, and 75 and, considering the rocking of lever 78 should normally release said levers under the action of springs 76, but plate 82 (Fig. 20) having slid to its extreme position as above described, groove 85 of said plate 82 passes beyond the vertical plane of lever 75 and none of levers 73, 74 and 75 will rise.

Consequently, plate 81 will pass over nose 185 of levers 73, 74 and 75 without driving any of said levers.

*Releasing of the corrector.*—Simultaneously, cam 152 (Fig. 1) releases roller 151, thus causing levers 150 and 148 to rock, said levers being connected through rod 149 and being under the action of springs 335. Shaft 146 will follow this rocking and teeth 145 will cease to cooperate with the ratchets 147, cooperating with said shaft 146 (Fig. 2).

*Third phase.—Positioning of driving bars.*—Shaft 39 continuing its rotation, cam 144 (Figs. 2 and 24) releases lever 142, which drives rod 141, said rod 141 releases lever 140 and allows shaft 139 to rotate under the action of spring 174. Rollers 137 carried by levers 138 keyed on shaft 139 and which, up to now, maintained driving bars 103, will be driven backwards and without being stopped by angle-bar 167, since, according to the above description of phase 1, said angle-bar has already followed the rearward movement of bars 31 during said phase 1. At this moment of operation of the machine, all driving bars 103 are released and are ready to slide rearwards under the action of springs 135 an according to the disposition of keys 114 which will have been depressed by the operator.

It should be noted here that, according to what has been described in my U. S. Patent No. 2,562,172, the teeth on stop bars 113 (Figs. 2 and 8) and the bevelled ends 161 of the vertical bars 155 of keys 114 are arranged in order that, when a key 114 in a given row is depressed, the corresponding stop bar 113 is stopped by said bevelled end 161 of said depressed key after having moved towards the back of the machine by a length which, measured in "pitches," is equal to the rank of the depressed key in said given row.

In the chosen example, operator is supposed to have depressed key $114_5$ (Fig. 2) in the row at the extreme right, i. e., that of the units, key $114_7$ in the immediate prior row corresponding to the tens and $114_2$ in the next row, or row of hundreds; consequently, the vertical bar of key $114_5$ in the units row will stop the corresponding stop bar, by engaging tooth 175, and the said stop bar will therefore have moved rearward by a length equal to five pitches. The vertical bar of key $114_7$ in the tens row will stop the corresponding stop bar through tooth 176, which progresses seven pitches and the vertical bar of key $114_2$ in the hundreds row will stop corresponding stop bar 177, which progresses two pitches. None of the other stop bars will meanwhile have been able to progress, since zero fingers 178 stop said stop bars by cooperating with teeth 179 of said stop bars, if no key has been depressed in the rows to which they correspond. Driving bars 103 are provided, as hereabove described, with a salient 133 which cooperates with a finger 134 projecting laterally of each stop bar 113 as each stop bar 113 is connected to one set of mobile angle members 98, $98_1$ by means of levers 104, $104_1$, and the corresponding ratchets 107, $107_1$ and counter ratchets 108, $108_1$, those mobile angle members 98, $98_1$ which are connected with the stop bars 113 which have been moved will progress by the same length towards the back of the machine so that the rearward progression of each driving bar 103 is equal to that of the corresponding stop bar 113.

*Fourth phase.*—*Action of the corrector.*—Rotation of shaft 39 continuing (Fig. 1), cam 152 cooperates with roller 151 and under the effort of its pressure, causes lever 150 to rock, which lever drives rod 149 which will, in turn, cause lever 148 to rock. Shaft 146, on which lever 148 is mounted, rotates clockwise and ratchets 147, which may better be seen in Figure 2, cooperating with said shaft, as hereabove described, insure, while at the same time correcting, the positioning of driving bars 103, said positioning depending upon the prior phase and also upon which of the keys of the keyboard have been depressed.

Figure 28:
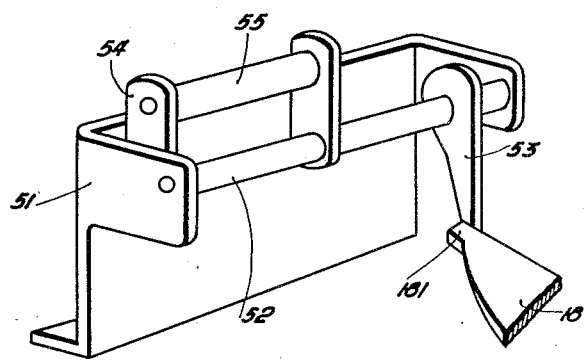
Fig. 28 is a perspective view of a detail of the counting frame selection mechanism.

*Engagement of the counting unit.*—In considering Fig. 6, it may be seen that, immediately after the beginning of this fourth phase, tooth $63_1$ of cam 63 cooperates with the nose of arm 62 of engagement lever 61, thus causing said lever to rock, which, in its turn, causes bar 56 to slide frontwards. Said bar 56 pushes on rollers 55 and $55_1$, and thus causes the unit composed of levers 54, $54_1$, shafts 52, $52_1$, and locking levers 53, $53_1$, to rock (Figs. 1, 4 and 28). The noses 181, $181_1$ of plates 18, $18_1$ are thus disengaged from said locking levers.

Springs 42 and $42_1$, previously tensioned due to the rearward movement of bar 45, may then cause plates 17 and $17_1$, 18 and $18_1$ to rock around shafts 20, $20_1$, respectively, said plates being accompanied by the shafts 16 provided with fingers 15. Fingers 15 (Fig. 20) corresponding to counting unit No. 4 in the front section and to counting unit No. 9 in the rear section, which have already been brought in front of said units, will cooperate with noses 180 and $180_1$ of triangles 13 and $13_1$, respectively. As hereabove described, said triangles 13 and $13_1$ will push bars 10 and $10_1$ of said units under the action of springs 64, $64_1$. All the slides 12, of counting units No. 4 and No. 9 will then be disengaged from locking angle-bars 65 and $65_1$, respectively, and will engage angle-bars 98, $98_1$ by means of the corresponding notches (said angle-bars being more visible in Figs. 2 and 5). It should be remarked that the locking levers 53 and $53_1$ will rock back as soon as tooth $63_1$ of cam 63 has passed nose 62 of lever 61, and spring 58 has returned bar 56 to its original position. Plates 18 and $18_1$ will therefore be locked again, but in the opposite direction.

*Fifth phase.*—*Preparation of the disengagement.*—Considering now Figure 3, after the end of the fourth phase, shaft 39 continues to rotate, cam 50 releases roller 49, and, by means of the same connections as hereinabove described bar 45 will be made free to return towards the front of the machine while slides 43 and $43_1$ will continue to exert a pressure, under the action of springs 46 and $46_1$, upon rollers 41 and $41_1$. However said pressure will not cause the unit, composed of plates 17 and $17_1$, 18 and $18_1$ to rock, as just above mentioned. The locking levers 53 and $53_1$, will lock noses 181 and $181_1$ of plates 18 and $18_1$.

*Return of driving bars, movement of slides and disengagement of functions.*—Meanwhile, cam 144 (Figs. 2 and 24) has reached a position which causes it to drive levers 142 and 140, connected by rod 141. Rollers 137 will bring back, frontwards, to their original position, all driving bars 103 which have been displaced rearwards (Figs. 24 and 25). All said bars will therefore return frontwards by the same length as that by which they have previously moved rearwards under the action of springs 135 during the above described third phase. This return movement, according to the above description, takes place while slides 12 are in engagement with mobile angle members 98 and $98_1$.

As the said mobile angle members 98, $98_1$ are still rigidly connected to driving bars 103 by means of the ratchets 107, $107_1$ and counter ratchets 108, $108_1$, those of said angle members which had been previously moved towards the back of the machine will follow the above mentioned bars 103 in their return movement and, at the same time, pull towards the front of the machine the slides 12 with which they engage.

Stop bar 113 and, therefore, driving bar 103, and angle members 98 and $98_1$, corresponding to the units, having moved rearwards by five pitches, before said angle members 98, $98_1$ had engaged the corresponding slides 12 in counting units No. 9 of the rear section $A_2$ and No. 4 of the front section $A_1$, the same members will move forwards by the same five pitches after having engaged said slides 12. Said slides 12 corresponding to the units in counting units No. 9 of the rear section and No. 4 of the front sections will therefore move forwards by five pitches. In the same manner, slides 12 corresponding to the tens in the two considered counting units will be moved forwards by seven pitches and the slides 12 corresponding to the hundreds in the same counting units will be moved forwards by two pitches.

Considering that, in counting unit No. 9 of the rear section $A_2$, the slides 12 corresponding, respectively, to the units, tens and hundreds are supposed to have been already moved forwards by two, one, and three pitches respectively, in a previous operation, the position now occupied by the three considered slides 12 will correspond to a total movement of two plus five, one plus seven and three plus two pitches, and the final position of said slides 12 represents the quantity:

$$312+275=587$$

the desired addition being thus performed.

In counting unit No. 4 of the front section $A_1$, the return movement of stop bar 113, driving bar 103 and mobile angle member 98 corresponding to the units causes a forward movement of the corresponding slide 12 which is greater than the complement to nine of the position, in number of pitches, previously occupied by said slide; in this case, the transfer mechanism must operate.

When the considered slide 12 which is supposed to have previously occupied a position corresponding to a forward movement of eight pitches, has been moved forward by two pitches, dent 120 of said slide 12 will push wing 1119 of the corresponding shaft 119 (Fig. 5).

Stud 118, fast with said shaft causes the corresponding stop member 117 to rock and that unlocking bar 111 (Fig. 11) corresponding to the extreme right order or units order, will no longer be stopped, either by stop member 117 which has rocked, nor by rake-shaped member 172 which has already been withdrawn during the first phase. Consequently, spring 112 will pull the unlocking bar 111 and cause it to slide frontwards. Said unlocking bar 111 being provided with a sloped section edge, such as above described, will rise as it moves frontwards. This rising movement causes stud 109 engaging the slot in said bar 111 to be moved upwards, thereby lifting counter ratchet 108 and ratchet 107, which releases corresponding mobile angle member 98. As soon as mobile angle member 98 is released, spring 128 (Figs. 7 and 24) pulls it rearwards until stop 127 of said angle member bears against counter-ratchet 108. The position of said stop 127 is such that the value of this rearward movement is exactly equal to ten pitches, the consequence of which will be that the slide 12, which is in engagement with said angle member 98 will be driven to its extreme rearward position. Meanwhile, driving bar 103 which has been separated from said angle member 98, after having moved by two pitches, continues its return movement for the remainder of the five pitches, that is three pitches. During this final movement, stop 127 of the considered angle member 98 is pulled frontwards by counter-ratchet 108, said angle member therefore moving again by three pitches toward the front of the machine, and, when said driving bar 103 has reached its initial frontwards resting position, the considered slide 12 will therefore be in position "3."

As hereabove described, each unlocking bar 111 is provided with a lateral salient 115 on which rests the end of the neighbouring transfer bar 106. This transfer bar corresponds to the next order of numeration. When the above mentioned unlocking bar 111 has been pulled forward by its spring 112, the neighbouring bar 106, corresponding to tens, has followed this forward movement under the action of its spring 110. Due to the sloping edges of said bar 106, this forward movement will cause said bar 106 to rise and thereby to lift stud 105 which engages the slot in said bar. Lever 104 which carries said stud and which is rotatably mounted on the next driving bar 103 is thus caused to rotate, thereby pulling ratchet 107 towards the front of the machine, the length of the slot in bar 106 and the movement of said bar being such that, when bar 106 is moved towards the front of the machine as hereabove explained, ratchet 107 is pulled in the same direction by a length which determines a frontward movement of one pitch of the bar 98 which is engaged, by means of its finger 126 with the considered ratchet 107. The mobile angle member 98 which corresponds to the tens, i. e. which engages the second slide 12 from the right in counting unit $A_1$, and which is moved by seven pitches towards the front of the machine due to its connection with driving bar 103, in the same manner as has been explained hereabove, is moved one pitch further due to the rocking of lever 104 of the above mentioned next driving bar 103. The total movement of said angle member 98, and therefore of the slide 12 of counting unit No. 4 of front section $A_1$ of the machine will thus be of eight pitches. As the last mentioned slide, corresponding to the tens, is supposed to have occupied a position representing the amount "2" due to a previous operation, it will now be brought to a position corresponding to the amount "2 plus 8," i. e. "10." As above mentioned, between position "9" and position "10," dent 120 of said bar 12 pushes wing 1119 of the corresponding shaft 119. Under the action of stud 118 carried by said wing, the second stop member 117 from the right, corresponding to the tens, will be caused to rock, thereby disengaging the corresponding unlocking bar 111. Said unlocking bar will move towards the front of the machine under the action of its spring 112 and thereby be raised as hereabove described. The same succession of operations as described in connection with transfer bar 106 of the units will be repeated in connection with transfer bar 106 of the tens, and slide 12 in counting unit No. 4 of the front section $A_1$ of the machine will be moved "2 plus 1" pitches. As it is supposed to have previously occupied position "1," it will finally occupy the position "1 plus 2 plus 1," i. e. "4." The final movement of the three considered slides 12 of counting unit No. 4 of the front section $A_1$ of the machine will therefore be:

$$128 + 275 = 403$$

the desired addition in said section having thus been performed.

*Phase VI.—Disengagement.*—Addition of amount "275" having been made in both front and rear sections of the machine and positioning of the corresponding slides 12 of counting unit No. 4 in the front section and of counting unit No. 9 of the rear section having been accomplished, the slides 12 of the said counting units must be disengaged from mobile angle members 98 and 98₁ and again locked to fixed angle members 65 and 65₁. This happens in the following manner:

In considering Figure 6, shaft 39 continuing to rotate, tooth 63₂ of cam 63 cooperates with the nose of lever 62 which rocks and by means of lever 61 and roller 60 pushes back bar 56 which causes a new rocking of rollers 55 and 55₁ fast with levers 54 and 54₁, as well as of shafts 52 and 52₁ and of locking levers 53 and 53₁ (Figs. 1, 4 and 28). The rocking of locking levers 53 and 53₁ releases plates 18 and 18₁. Said plates, together with plates 17, 17₁ and shafts 16, 16₁ rock back under the action of springs 42, 42₁. Fingers 15 and 15₁, which cooperated with noses 180 and 180₁ of counting units No. 4 of the front section and No. 9 of the rear section no longer act on said noses, and triangles 13 and 13₁ are released. Corresponding springs 64 and 64₁ push back the said counting units and slides 12 thereof are disengaged from mobile angle members 98, 98₁ and engage with fixed angle members 65 and 65₁ under the action of springs 64 and 64₁ (Fig. 5).

*Phase VII.—Resetting.*—Resetting of mechanical transfer members which have operated and the return to the rest position of function selecting members and of counting units are carried out in the following manner:

Cam 38 (Fig. 2) driven by the rotation of shaft 39 cooperates with lever 37, which by means of rod 36 causes lever 35 to rock, as well as lever 34, with which it is fast, in order that levers 33 and 33₁ may cooperate with rollers 32 and 32₁, which causes a frontward sliding of bars 31 and 31₁. At this moment, cross bar 30 (Fig. 2) drives frontwards stop bars 91, 28 and 28₁ (Figs. 1 and 4) which are respectively acted upon by springs 84, 164 and 164₁. Said stop bars therefore return to their resting position. On their side, angle bars 167 and 167₁ drive mobile angle members 98 and 98₁ up to their extreme front position, whereas slopes 168 and 168₁ exert an upward pressure on levers 169 and 169₁, thus causing levers 170 and 170₁ to rock, together with rake-shaped members 172 and 172₁. In their rocking movement, said rake-shaped members (Fig. 7) exert a pressure on salients 115 and 115₁ of unratching bars 111 and 111₁, which on the one hand, permits nose 116 of said bars 111 and 111₁ which have operated a transfer, to pass behind stop members 117 and, on the other hand, permits the return to ratching position of ratchets 107 and 107₁, as well as of counter-ratchets 108 and 108₁. Meanwhile, salients 115 and 115₁ will also bring back to their resting position the transfer bars 106 and 106₁ which have operated transfers. Shaft 39 having terminated its rotation, will be stopped by the self-unclutching device E, and the machine is ready to record a new operation.

Subtraction

Subtracting operations are operated through adding the complement to "9" of the amount to be subtracted, with one unit in the lowest numeration order, from which is subtracted one unit in the highest numeration order. This operation will be more clearly explained by means of the following example:

Number "275" is to be subtracted from counting unit No. 9 of the rear section and from counting unit No. 4 of the front section, the slides of the first one being at "+368" and those of the latter at "+93."

Operator depresses the counting unit keys and the keys of the amounts to be subtracted, as described in the adding operation and furthermore depresses the subtraction key 92₅ visible in Figure 4. He starts the motor, shaft 39 rotates and the cycle develops as described for addition. However, the fact that key 92₅ has been depressed gives rise to a certain number of modifications hereafter indicated.

During phase I, stop bar 91 (Figs. 4 and 20) will be stopped when tooth 184 cooperate with the rod of key 92₅. Consequently, salient of stop bar 90 will stop the movement of stud 89 fast with lever 87, and this will stop plate 82 which was pulled by spring 84, and groove 85 will come on top of lever 75 which will then be released.

Figure 8:
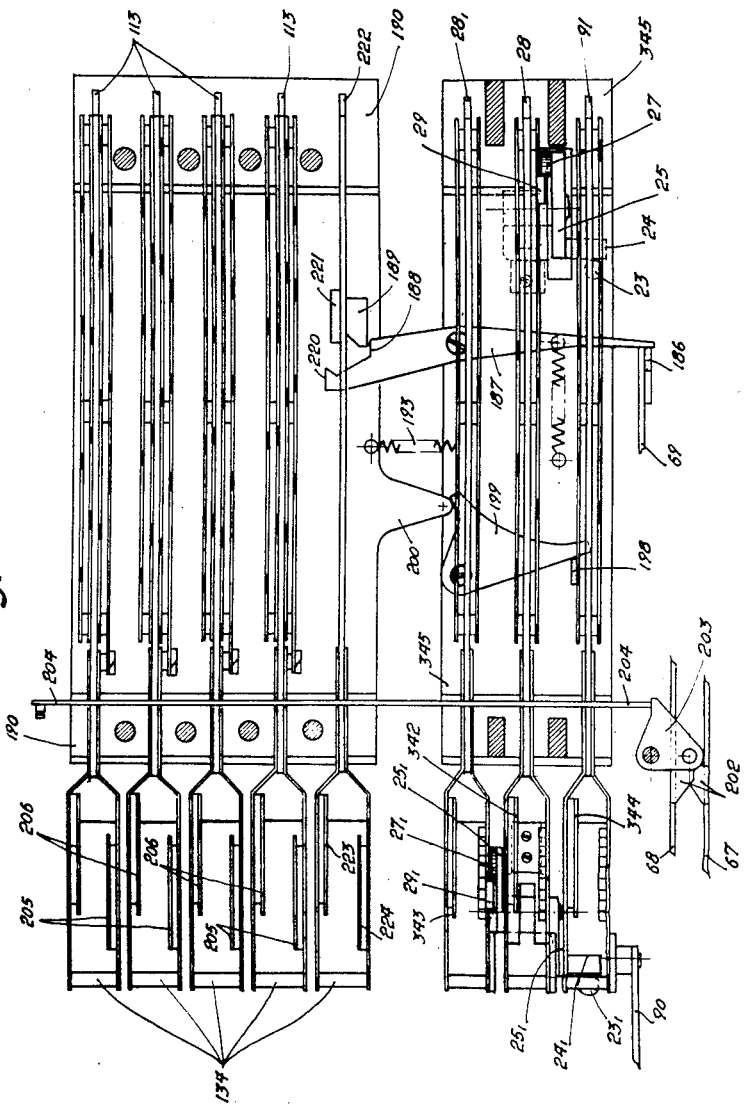
Fig. 8 is a partial horizontal section along the line VIII of Fig. 2 and showing the disposition of the stop bars.

During phase II as precedingly described, rocking of plate 81 was clear. Still considering Figure 4, it may be seen that lever 75 will rise, acted upon by spring 76, and nose 185 of said lever 75 will be introduced into the way of plate 81 which is rocked. Said plate 81, continuing its movement, will end up in meeting nose 85 hereabove mentioned, on which it will exert a pressure and will then drive frontwards lever 75 and bar 69 on which said lever shifts; in Figure 8, the nose 186 of bar 69 is visible. In its rocking movement, plate 81 will cause lever 187 to rock and edge 188 of said lever advancing in this movement will allow salient 189 to pass, said salients being provided on frame 190 on which stop bars 113 are fixed. Frame 190 is held by two rods 191 and two rods 192, rotatively mounted on the square struts 4 and 5 (Fig. 2). The unit thus formed is under the action of spring 193, which pulls said unit towards the left hand side of the machine (Fig. 8). Stop bars 113 are provided with two rows of teeth, one for the adding operation, the other for subtracting operations. When all the stop bars 113 have not rocked towards the left hand side of the machine, the adding teeth are opposite key rods 114 and operated as described in the adding operation. On the contrary, when said stop bars 113 have laterally rocked under the action of spring 193, such as now described, the subtraction teeth of said stop bars will be opposite key rods 114. Subtracting teeth are arranged on stop bars 113 in such a manner that they allow said stop bars, when the latter slide rearwards under the action of springs 135, to be displaced a length corresponding to a number of pitches equal to the complement to 9 of the order in which keys 114 will have risen in the keyboard. Key "1" will thus allow a sliding of 8 pitches, key "2" of seven pitches and so on up to key "9" which will lock corresponding stop bar 113 without allowing the return thereof rearwards. But, if no key is depressed in a determined row of the keyboard, the corresponding stop bar will slide to a value of nine pitches since, on the one hand, the subtracting rocking of bars 113 towards the left allows all teeth 179 to be out of the vertical plane of the zero fingers 178 (Fig. 2) and, on the other, stop pins 194 provided on guide-plate 102 (Fig. 24), limit the displacement of salients 133 of driving bars 103, said stop pins being placed exactly at a distance equal to nine pitches from said salients 133 when these are in their extreme frontward position.

During phase III, in reconsidering the above example and in considering Figure 2, it may be seen that the rod of key 5 of the units which has been depressed by operator will stop the corresponding stop bar through its tooth 195, rod 7 will perform the same operation through tooth 196 and rod 2 through tooth 197. The other stop bars 113 will not be stopped by any key rod of the keyboard, but will be stopped by pins 194, which, as above explained, allow a travel of nine pitches.

Phase IV is identical to phase IV described for addition.

In the course of phase V, the return of driving bars 103 and the transfer operations are performed in the same manner as in the adding operation.

Still considering the proposed example, slide 12 of the units of counting unit No. 9 belonging to the rear section, being at the position "8," and, on another hand, the driving bar having to operate a return movement of "4," corresponding to the complement of "9" to "5," slides 12 will be in position "2":

$$8+4=12$$
$$12-10 \text{ (return)} =2$$

A supplementary advance of one pitch will take place for slide 12 of tens in same counting unit No. 9 as described in the corresponding phase of the addition. Simultaneously, the driving bar of tens makes a return of "2" (complement to "9" of "7") and drives slide 12 of tens which already was on "6." Slide of tens will thus be in position "9," that is:

$$6+1+2=9$$

and will thus make no transfer in the order of hundreds. Slide 12 of hundreds which was in position "3" is driven by the return movement of the corresponding driving bar a value of seven pitches (complement to "9" of "2"). The transfer operation then takes place and said slide of hundreds will thus come to position zero:

$$3+7=10$$
$$0-10 \text{ (return)} =0$$

The slide corresponding to the fourth numeration order, which was at its zero position, will be driven by its corresponding driving bar a value of nine pitches plus one, equivalent to the transfer, that is ten pitches, less ten pitches (corresponding to the return) that is zero. The same movements will be reproduced in all the further numeration orders in which all slides 12 return to zero after having advanced $$9+1=10$$

and having come back 10 as hereabove described.

Stop members 117 such as shown in Figure 7 and corresponding to both the higher and lower numeration orders (the lowest being that of the units) are provided with arms 121 and 121₁ respectively connected by a rod 122, so that stop member 117 corresponding to the highest order will rock as above described, that of the lowest numeration order will follow this movement and will cease cooperating with nose 123 of the transfer slope of the order of units, which will cause the groove of said slope to rise and the consequence thereof will be the increasing of one pitch of the advancing movement of the mobile angle member which will position slide 12 of units at "3" instead of "2." Consequently the machine has performed in the rear section counting unit No. 9 the subtracting operation:

$$368-275=93$$

In counting unit No. 4 of the front section, it has been supposed that slide 12 of units was positioned at three pitches from its extreme rear position, that the slide of tens was at nine pitches and all other slides at zero, that is at their extreme rearward position. Through analysing the movement which these slides will have to perform during the return of the driving bars 103, it will be seen that the slide of units will be driven four pitches frontwards and, since it had already advanced three pitches with respect to its normal position, it will thus stop at position "7." The slide of tens which was at "9" will be driven two pitches and will return ten pitches thus finally stopping at "1" and causing the slide of hundreds to advance one supplementary pitch. The slide of hundreds which was at "0" shall be driven frontwards of the machine seven pitches, plus the mentioned supplementary pitch, that is "8." All other slides which were at "0" will be driven by nine pitches through their corresponding driving bar 103 and will stop at "9." If the maximum capacity of the machine is supposed to be five numeration orders and in remembering that slides of account 4 of the front section were at "00093" if subtraction is made of the amount of 275 which, as explained is the addition of the complement to 9 of each figure, that is "99724," slides of counting unit No. 4 of the front section will be in position "99817," which represents the complement to "9" of each figure of the negative number resulting from the subtraction:

$$+93-275=-182$$

The other phases of the cycle comprise the same functions as those described in the addition chapter, but it should be remarked that, in the course of phase 7, when stop bar 91 returns under the action of cross bar 30, a salient 198 of said stop bar 91 (Fig. 8) causes lever 199 rotatively mounted on frame 345 to tilt. This lever exerts a pressure on a nose 200 provided on frame 190, whereas spring 193 brings said frame back beyond its normal position, at the adding position towards the right hand side of the machine so that lever 187 pulled by a spring, rocks to its resting position, so that edge 188 passes by salient 189.

*Totalizing-transfer.*—Operator depresses the keys of the selecting keyboard corresponding to the counting unit to be totalized in one section of the machine, and to the counting unit which is to receive the totals in the other section.

Operator also depresses the "total" key 92₂ or 92₄ according to the section containing the counting unit which is to be emptied, and starts motor M.

Shaft 39 will rotate and the machine will operate in the following manner, an example having been chosen in order to make things clearer.

It will be supposed that counting unit No. 4 of the front section is to be totalized, said counting unit containing a negative amount of "182," and that said amount is to be transferred to counting unit No. 9 of the rear section, which contains a positive amount "93."

Operator depresses keys 114₄ of the front section, 114₉ of the rear section (Fig. 1), 92₂ of the keyboard of functions (Fig. 4) and starts motor M.

Shaft 39 will perform one rotation, during the phases of which the following movements will be produced.

Phase I develops in the same manner as in the adding and subtracting cases, with the difference that the stop bar of functions will be stopped by its tooth 225, cooperating with the rod of key 92₂.

Plate 82 (Fig. 20) will also be stopped at this moment despite the action of spring 84 and groove 85 will come above lever 74 thus released.

It has been seen hereabove that, during phase II, the rocking of plate 81 (Fig. 4), enabled lever 74, thus released, to rise by cooperation of said plate 81 with nose 185 of said lever 74. This operation causes the frontward sliding of bar 67 which will exert a pressure on roller 55 which, in turn, will repel locking member 53, which releases nose 181 of plate 18 and the corresponding engaging members of the counting units of front section A₁ (Fig. 1) and simultaneously, spring 42 (Fig. 3). Said spring, already under action of slide 43 during the preceding phase, will cause shaft 16 to rock until one finger 15 cooperates with nose 180 of counting unit No. 4 of the front section and slides 12 of said counting unit are disengaged from the fixed angle members 65 to engage with mobile angle members 98.

During the frontward progression of bar 67, an angle 202 (Figs. 20 and 8) fast with said bar 67 rocks a lever 203 rotatively mounted on a stud fast with the square strut 5. This lever 203 then causes tilting bar 204 to slide to the right hand side of the machine, the fingers of bar 67 causing in turn the tilting of all zero fingers 178 and all stop flaps 336 (Fig. 21). The effect of any such key 114, which could have been depressed by mistake, will thus be cancelled and at the same time the way will be open to stop bars 113 which are caused to progress rearwards in the course of the following phase of the same cycle.

It has already been seen that in the course of phase III, rollers 137 moves out of the way in order that driving bars 103 may slide rearwards of the machine under action of springs 135 (Fig. 1). This movement of rollers 137 will take place while counting unit No. 4 of the front section cooperates with mobile angle members 98 and while counting unit No. 9 of the rear section is still locked through its fixed angle member 65, since bar 67, as described above, has unlocked only locking member 53 of the front section, and not locking member 53 of the rear section.

In considering the cited example, it will be seen that during said phase III, slide 12 of the units of counting unit No. 4 of the front section which was ahead seven pitches with respect to its extreme rearward position cannot be displaced more than seven pitches, since stop plate 162 will lock, after a displacement of seven pitches, all of the movable members of the units, as well in the front section as in the rear section (Fig. 2). Slide 12 of the tens will lock the mobile members of said numeration order after a displacement of one pitch, that of the hundreds after a displacement of eight pitches and all other slides after a displacement of nine pitches. In other words, the movable members, after the mentioned displacements and with respect to their extreme rearward position, will be at two pitches for the units, at eight pitches for the tens, at one pitch for the hundreds and at zero for all other numerating orders, whereas all slides of counting unit No. 4 of the front section will be at the zero pitches.

In the course of phase IV, tooth 63₁ of cam 63 (Fig. 6) cooperates with lever 62₁, this resulting in a displacement towards the front of the machine of bar 56 so that lever 54 will rock, causing the locking member of the rear section to be released. Locking member 53 of the front section was already released in the course of phase II. Consequently, the fixed angle members 65 ceases cooperating with counting unit No. 9 of the rear section and mobile angle members 98₁ will then cooperate with said counting unit, as already described.

It has already been mentioned that, in the course of phase V, cam 50 releases lever 48 (Fig. 3), thus causing springs 46 and 46₁ to act. Concerning the front section, spring 46 will be able to draw slide 43 frontwards and said slide 43 will cooperate through its arm 44 with roller 41, thus rotating plates 17 and 18, the latter not being locked by locking member 53, and the result thereof being that, the nose 180 of counting unit No. 4 no longer cooperating with a finger 15, will be under the action of spring 64 and mobile angle members 98 will cease cooperating with it, the fixed angle members 65 now locking the slides 12 of said counting unit.

It is easy to see how this counting unit has been totalised, i. e. all its slides 12 brought back to their extreme rearward position and locked in this position.

Development of phase 6 is identical to the adding operations. If the above example is taken again, slide 12 of units of counting unit No. 9, belonging to the rear section of the machine and which was, during the preceding phase at three pitches from its extreme rearward position, will be driven 7 pitches frontwards, that is 10 in all, thus causing transfer operations to be carried out as above described, and there follows a return of 10 pitches of slide 12 of units which will take up position zero as well as an advance of one pitch of the slide of tens.

Now, said slide of tens, which was at nine pitches, will be driven one pitch, to which should be added the transfer of one pitch and subtracted the return of ten pitches. Consequently, said slide shall take up position "1" and at the same time, will cause the slide of hundreds to advance one pitch. Said slide of hundreds, which was at zero, will be driven eight pitches, plus a transfer of one pitch, which will cause it to advance nine pitches in all. All other slides 12 corresponding to higher numeration orders will be driven nine pitches and, since no prior transfer exists, they will be stopped at this extreme frontward position.

During this phase and considering Fig. 6, tooth 63₂ of cam 63 will again engage with the nose of lever 62, which will cause the counting unit No. 9 of the rear section to be disengaged and the corresponding slides to be locked in their resting position, as above described.

Resetting, during phase 7, of all members which have determined a transfer, operates in the same manner as described for addition. Referring to the given example, it should be noted that slides 12 of the front counting unit No. 4 and rear counting unit No. 9 were, before the above described totalizing cycle, respectively in position "—182" and "+93" whereas, at the end of said cycle, they respectively are in positions "0" and "—89," that is "99.910" representing the complement to "9" of each of figures "0," "0," "0," "8" and "9."

Consequently, it should be noted that, in a machine according to the present invention, the number of slides 12 of each counting unit, as well as the number of driving members and fast locking angle members must be greater by 1 than the number of numeration orders which are to be represented in the machine.

Said slides and supplementary members are arranged not only to cooperate with transfer members of the lowest numeration order, by means of rod 122, but are also arranged to determine the positive or negative feature of the material operation, through position of the slides corresponding to the numeration order. For example, position "09345" of the slides of a counting unit will correspond to a positive number, whereas position "90654" will correspond to the same number, but the latter will be negative. In the same manner position 00000 of the slides of a counting unit corresponds to zero considered as a starting position of positive quantities, whereas position "99999" also corresponds to zero, considered, this time, as a starting position for negative quantities.

In this manner, a machine built according to the present invention, may accumulate positive or negative amounts, corresponding to the depressed keys in the keyboard of two counting units belonging to different sections of the machine, whether the sign of the amount of the operation to be carried out and contained in one or the other of the counting units be positive or negative. In the same manner, said machine may accumulate, in a counting unit belonging to one section, all the operation amounts contained in the counting units belonging to the other section, regardless of the positive or negative characteristic of either counting unit.

In considering Figs. 8 and 2, it may be seen that stop bars 113 are provided with two slopes 205 and 206 which cooperate with sliding members 207 (Figs. 1 and 2), one of said sliding members being provided for each numeration order. Said sliding members cooperate with printing bars 208 through arms 218. Printing type bars 209 are rotatively mounted on printing bars 208 and the whole unit formed of said members is maintained upwards by springs, not shown, and downwards by a cross bar 210, which cooperates with printing cams 211 (Fig. 1) fast with a shaft 212 rotatively mounted on the intermediary flange 8 of the machine, on the one side, and on the other, on bearings fast with printing plate 213 secured on the square strut 6.

Said shaft 212 is provided with a lever 214 provided with a roller 215.

During phases 4 and 5 of the cycle, precedingly described, when ratchets 147, cooperating with shaft 146 as above indicated, maintain teeth 145 of the movable members driven by bars 103, a cam 216 which up to now cooperated with roller 215 in order to maintain, as indicated, the printing cam 211, ceases cooperating with said roller and consequently, said printing cams 211 rise under the action of a spring, not shown. At this moment, members 207, arms 218, bars 208 and printing type bars 209 follow the rising movement until hooks 217 provided on members 207, are applied against a tooth of slopes 205 and 206. The width between these teeth on said slopes is calculated in such a manner that the printing character which will show up to be stamped on a roller 219 (Fig. 2) will be a function of the horizontal rearward advance of the corresponding stop bar 113.

It has already been seen that stop bars 113 progress rearwards a number of pitches which is proportional to the figure represented by the depressed key in adding, and inversely proportional to said figure in subtracting, and that all stop bars 113 are displaced laterally towards the left hand side of the machine when said machine operates a subtraction. Teeth 205 and 206 are fixed on stop bars in such a manner that in case of addition when the stop bars have not been displaced towards the left, the corresponding hook 217 cooperates with slope 206, the height of the teeth of which increases proportionally to the advance of said bar in adding position and that in the case of subtraction, when said stop bars are displaced to the left, hook 217 cooperates with slope 206, the height of the teeth of which decreases in the same proportion. In consequence, both in addition and in subtraction, printing character bars 209 will progress upwards proportionally to the figure represented by the key depressed by the operator, thus printing the real number of the complements to "9" of said figures.

It has also been seen that for a totalizing operation, each stop bar 113 progresses rearwards of the machine a number of pitches equal to the complement to "9" of the position of the slide corresponding to the moment where the totalizing cycle starts.

The printing of the totalized amount is carried out in the same manner and at the same moment of the cycle as in adding operations. In Fig. 8, lever 187 is provided with a nose 220 cooperating with stop 221, of a bar 222 parallel to stop bars 113 and circulating in the same frame 190. Said bar 222 is provided with two notches 223 and 224 cooperating with printing characters in the same manner as scales 205 and 206 but placed at different heights, so that height of scale 224 causes the printing of sign "+" and that height of scale 223 causes printing of sign "—" by a printing bar, as described for the printing of the results of the operations.

In case of a negative amount, for instance "99.761," bar 222 will be displaced 9 pitches and stop 221 causes lever 187 to tilt so that the groove 188 being no longer locked, frame 190 moves to the left under the action of spring 193. When upward displacement of printing bars 207, 208 and 209 takes place the right hand scales 206 and 223 will operate since result scales 206 are decreasing and the movement of the stop bars towards the rear of the machine is operated in proportion with the complement of the real totalized amount. Printed figures will correspond to the real totalized amount and not to a complement. In the example, position "99761" will be printed in the form "—238."

Let us now consider a positive amount, for example "00238." At the moment of totalizing bar 222 will not progress rearwards so that stop 221 will not cause lever 187 to tilt and the latter will continue to maintain frame 190 in its position towards the right hand side of the machine. When printing members 207, 208 and 209 progress upwards, the left hand side notches 224 and 205 (Figs. 1 and 2) stop the hooks 217. Since the result scales 205 are increasing, the printed figures will correspond to the real amount of the displacement of the slides; in the example, position "00238" will be printed as "238."

SUB-TOTALIZING—TRANSFER

It has been seen that for totalizing operations, operator depresses keys $92_2$ and $92_4$; for operations of sub-totalizing, keys $92_1$ or $92_3$ must be depressed, according to the section containing the counting unit to be sub-totalized.

As may be seen in Fig. 4, stop bar 91 will be stopped by tooth 225 and $225_1$ and at that moment groove 85 of plate 82 will stop above lever 73 or $73_1$. Levers 73 and $73_1$ are provided with a supplementary arm 77 and shaft 39 is provided with a cam 226 fast with said shaft which during phase 4, precedingly described, shall cause lever 227 to tilt. Said lever 227 is provided with a roller 229, the operation of which is the following. When one of levers 73 or $73_1$ is pushed back towards the front of the machine by the plate 81, roller 229 will cooperate with supplementary arm 77 which then causes arm 73 or $73_1$ to tilt, according to the case. Said lever thus tilted will no longer be engaged with plate 81, and bars 67 or 68 (Fig. 20) will come back to their resting position under action of springs 70 or 71. At this moment rod 55 (Fig. 1) will cease being under control of bars 67 or 68, shaft 52 will be tilted by a spring and locking levers 53 or $53_1$ will lock plate 18 so that disengagement of the sub-totalised counting unit will not be brought about in the course of phase 5 but only in the course of phase 6 when tooth $63_2$ of cam 63 cooperates with the nose of lever 62 (Fig. 6).

In these conditions, slides 12, instead of being locked at the extreme rearward position of the machine, as in the "total" operation, are brought back, in the course of phase 5, to the position which they occupied at the beginning of the operation, before being disengaged.

Printing on a roller 219 of the transfers in subtotal is performed in the same manner as precedingly described. Stop bars 28 and $28_1$ (Fig. 8), as above explained, cooperate in the selection of the counting units. Said bars are provided with notched slopes 342 for bar 28 and 343 for bar $28_1$. Said notched slopes cooperate with the printing members in the same manner as that described for notched slopes 205 and, so that the number of the selected counting unit will be printed next to the registered amount. Stop bar 91 is also provided with a notched slope 344 which cooperates in the same manner with printing members and which has for its object to print, next to the number of the selected counting unit, the symbol corresponding to the function which has been selected by means of keys $92_1$, $92_2$, $92_3$, $92_4$, $92_5$ (Fig. 4). These function symbols may be represented by letters or figures and in order to simplify the description, the following examples have been chosen.

0 : for registering operations of positive amounts and for which none of the keys 92 are to be repressed (Fig. 4);

◊ for the registering operations of negative amounts for which key $92_5$ should be depressed;

TAV for totalizing operations of front section counting units and for which key $92_4$ is to be depressed;

TAR for totalizing operations of rear section counting units for which key $92_2$ should be depressed;

STAV for sub-totalizing operations of front section counting units for which key $93_3$ should be depressed;

STAR for operations of sub-totalizing of rear section counting units for which key $92_1$ should be depressed.

By means of the combination of selecting members for calculation and printing such as described, all the numerous functions capable of being carried out by the machine, are controlled by the operator by means of a keyboard for selection of functions $92_1$ to $92_5$ (Fig. 4) and of a keyboard for selection of counting units $93_1$, $93_9$ (Fig. 1) in order to pre-select any combination of functions and of counting units and to operate any calculation or printing operation thus pre-selected by depressing corresponding keys after having started motor M.

If the same examples are taken once again, it will be seen that one line 0  9  4  275 printed by the machine, would indicate that a sum of "275" has been introduced positively in counting units No. 4 of the front section $A_1$ forwards and No. 9 of the rear section $A_2$ rearwards, keys $93_9$ and $93_4$ corresponding to the respective sections having been depressed.

A line reading

◊  9  4  275 indicates that the same sum has been introduced in both mentioned counting units, but negatively. Operator having depressed the same selection keys for the counting units and, furthermore, key $92_5$.

In the same manner:

0  0  4  275 would indicate that sum 275 has been introduced positively in the front counting unit No. 4, without affecting any of the rear counting units and in this case, key $93_4$ only would have been depressed.

If the printed line reads

STAV  9  4  —  182 this indicates that counting unit No. 4 of the front section has been totalized and that its balance "182" has been transferred negatively to counting unit No. 9 of the rear section. Keys $93_9$ corresponding to the rear section and $93_4$ corresponding to the front section, as well as key $92_4$ have been depressed.

A line reading

TAV  0  4  —  182 indicates that the same counting unit has been totalized in the same manner but that its negative balance "182" has not been transferred to any counting unit of the rear section. For carrying out this operation, front keys $93_4$ and rear keys $92_4$ have been depressed.

A line reading

STAR  9  4  +  89 would indicate that counting unit No. 9 of rear section has been totalized and that its balance 89 has been transferred negatively to counting unit No. 4 of the front section, the depressed keys being rear $93_4$ and front $93_4$, as well as $92_2$.

Finally, a line such as

STAR  9  4  —  89 would indicate that the operation would be one of sub-totalizing, the depressed keys being rear $93_9$ and front $93_4$, as well as key $93_3$.

All possible combinations may be pre-selected in the same manner, in order to carry out any operation or series of operations, accounts, tabulations, statistics, or others.

As shown at Figs. 1, 2, 22 and 15, printing roller 219 is rotatively mounted between two parallel flanges 230 and $230_1$ of a rocking member and fast with a shaft 231 rotatively mounted in holes provided in both parallel flanges 232 and $232_1$ of the frame of a carrier. Said flanges 232 and $232_1$ provide, together with two bars 233 and 234, a rigid frame inside which the unit composed of shaft 231, flanges 230 and $230_1$, and roller 219 may rock. A spring 235 pulls parallel flanges 230 and $230_1$ upwards, but the effort of this spring is limited by two hooks 236—$236_1$ provided respectively on flanges 230 and $230_1$, which hooks cooperate with two ratchets 237—$237_1$ fast with a shaft 238 rotatively mounted on flanges 232 and $232_1$. Two handles 239 and $239_1$ drive the movement of flanges 230 and $230_1$, otherwise under the action of a spring 235, so that after engagement of ratchets 237 and $237_1$, roller 219 remains in its printing position. Another lever 240 is rotatably mounted on flanges $232_1$.

A nose 241 of said lever 240 is provided to draw apart the ratchets 237 and $237_1$, and in this case, the parallel flanges 230 and $230_1$ will obey the action of spring 235 and will rise again, thus permitting the front feeding of documents which are to be printed by the machine. Rails 242 and 243 are fixed to flanges 2 and 3 of the machine (Figs. 1, 2, 14, 15 and 16), said rails being arranged to cause the carrier to slide by means of rollers in any known manner. A cross bar 244 is fixed by its ends to flanges 232 and $232_1$ and a rack 245 slides on said bar; a toothed wheel 246 engages rack 245 so that when the wheel turns clockwise, the carrier turns to the right and when the wheel turns counterclockwise, the carrier turns to the left. A rod 247 is rotatively mounted at the extreme left of the rack 245 and at the other end of said rod is also rotatively mounted a lever 248 which is connected to a support 249 fast with the left flange 232. Rod 247 can be extended by means of a slot and spring, shown in Fig. 15. At the upper part of lever 248 is fixed a stud 250 which cooperates with another stud 251 fast with a lever 252 rotatively mounted on the left parallel flange 230. Rack 245 slides on bar 244 as above explained, but this sliding is limited by devices known per se, such as shouldered shafts and slots. On another hand, said rack is permanently under the action of a spring 253, the other end of which is fixed on bar 244 of the carrier.

When wheel 246 starts to move counterclockwise, as the machine is viewed from the rear, as illustrated in Figure 15, said wheel moves the carrier to the left as above explained, but before causing said displacement, said wheel 246 will have caused the sliding of the rack on bar 244. Lever 248 will rotate counterclockwise and stud 250 cooperating with stud 251 and lever 252 will follow immediately. Lever 252 is provided with another stud 253 fixed in such a manner with respect to the rocking center 254 that it will displace a slide 255 with which it can cooperate through a stud 256 mounted on a slide 255. Slide 255 is fast with parallel flange 230 (Fig. 1) and is provided with a nose cooperating with a ratchet-wheel 257 fast with the printing roller and provided to rotate said roller by an angle corresponding to the desired spacing of lines.

In the above description, it has been indicated that wheel 246 could rotate both ways. Said wheel is driven by an electric motor and controlled by a clutch the description of which is given hereafter.

A plate 258 (Figs. 14, 15 and 16) is fast with base 213 (Fig. 2) and is provided with a shaft 259 around which rotates a pinion 260. Said pinion 260 is driven by toothed wheel drives by a pinion 261 fast on the end of reductor shaft 262. Pinion 260 drives two toothed wheels 263 and 264 which cooperate in such a manner so that wheel 264 rotates clockwise and wheel 263 counterclockwise. This disposition is visible in Figure 15 which shows the machine as seen from the rear. Both wheels are mounted in socket shaped members 265—266, set on plate 258 and each provided with two triggers 267 and 268 rotatively mounted in gaps provided in the body of said wheels perpendicularly to their plane of rotation. A second flange 269 is connected through struts 270 to the plate 258. Two ratchet wheels 271 and 272 fast with pinions 273 and 274 cooperate with wheel 246 which drives rack 245. Two shafts 275 and 276 are slidably mounted inside sockets 265 and 266 and are provided with washers 277 and 278 entering grooves provided at the end of triggers 267 and 268. According to the sliding position of said shafts 275—276, the noses of triggers 267 and 268 may or may not cooperate with the corresponding ratchet wheel 271 or 272. A third flange 279 is connected to flange 269 by means of struts and is provided with horizontal bearings in which a shaft 280 may oscillate. Said shaft 280 is provided with a double arm forming a rocker 281, provided with two studs 282 and 283 which enter grooves provided in rollers 284 and 285 fast with shafts 275 and 276.

The disposition of the transmitting and unclutching members, which has been described, shows that if shaft 262 always rotates in the same direction, for example clockwise when looking at the machine from the rear, according to Figure 15, two positions of rocking member 281 will determine the rotating direction of wheel 246 controlling the movement of the carrier.

If triggers 267 cooperate with ratchet-wheel 271, the latter will drive wheel 246 clockwise (looking at the machine from the rear, Fig. 15) and the carrier will be moved towards the right, ratchet wheel 272 then being loose on its socket.

On the contrary, if triggers 268 cooperate with ratchet-wheel 272, it is the latter which will then drive wheel 246 and the carrier will be moved to the left and in this case the ratchet-wheel 271 will be loose on its socket. Rocking member 281, being rigid, will never be capable of cooperating at the same time with all clutching members.

As shown in Fig. 14, member 281 is maintained in position by balls 286 arranged in holes provided in bosses of flange 279 and maintained in their seats by means of springs shown in Fig. 14.

The two positions just described are the two extreme positions of rocking, but there may be an intermediary position, in which member 281 is parallel to flanges 279 and 269.

The length of the noses of triggers 267 and 268 is calculated so that in this third position, none of the triggers cooperate with ratchet-wheel 271 nor with ratchet-wheels 272.

In this case toothed wheels 263 and 264 will rotate but wheel 246 will not follow this rotating movement and the carrier will remain at a standstill.

The control of the positions, i. e. the clutching of the driving members of the carrier, as they have been described, may be operated either automatically in the course of the cycle of the machine, or by an operator, with manual controls.

The automatic control operates in the manner described hereafter with reference to Figs. 1, 2, 16, 17, 18.

Shaft 280 is provided with a fixed plate 287, said plate 287 being provided with roller 288.

On flange 279 are fixed two supports 289 in which a shaft 290 may rotate and slide parallel to its axis.

A lever 291 is fast with shaft 290 and its lower end is provided with roller 292 whereas its upper end cooperates with roller 298, either on the left of its axis, or on the right, according to the axial position of shaft 290.

As shown in Figs. 1 and 2, printing shaft 212 carries a lever 293; said lever carries a rotatively mounted cam 294 acting as a ratchet and the angular position of which is controlled by a spring and a stop.

When cam 216 ceases cooperating with roller 215, shaft 212, as hereabove seen, rotates counterclockwise. At this moment, cam 294 passes under roller 292, but when cam 216 cooperates anew with roller 215 and thus rotates shaft 212, this time clockwise, ratchet 294 will then repel roller 292 and lever 291 will rotate.

The end of lever 291 will cooperate with roller 288 either in its lefthand side part, or in its righthand side part, according to the axial position of shaft 290 and rocking member 281 will follow this rotation, acting either upon triggers 267 or upon triggers 268 and finally causing the movement of the carrier, either to the right, or to the left.

The manner in which the operator may give shaft 290 the necessary axial position in order that the carrier be moved in the desired direction, will be hereafter explained.

Bar 244 is provided with a tabulating bar 295 (Fig. 18) and said tabulating bar is fixed to bar 244 in a removable manner. As many tabulating stops 296 are provided as are necessary in order to stop the carrier at the intervals required by the position of the columns of the document to be printed by the machine.

Two locks 297 (Figs. 16, 17 and 18) are arranged on a plate 298 fast with flange 279. These locks can, on the one hand, slide lengthwise and, on the other, slightly shift around shafts 299 fast with plate 298. Two levers 300 are rotatively mounted on the inner side of a cover 302 fixed by means of struts to plate 298 and are maintained in their position by springs 303 attached to studs fast with plate 298. A rounded end of said levers 300 enters into a groove provided inside locks 297, so that said locks are pushed frontwards of the machine and such a movement is limited by studs 301. Two other levers 304 rotatively mounted on plate 298 are under the action of springs 305 and maintained in their position by studs 301 so that the edge 304₁ of said levers 304 exerts a pressure against locks 297 and thus maintains them in contact with stud 306 fast with plate 298. Thus, the locks are guided in their longitudinal movement. The above mentioned self-unclutching members will be described more in detail hereafter.

When the carrier is moving, either to the left or to the right, a tabulating stop 296 will come into contact with one of locks 297. Said lock will tilt longitudinally and disappear, against the action of the corresponding spring 303. The considered stop will apply against the other lock. Said other lock will receive a shock resulting from the inertia of the carrier, will tilt and thus drive corresponding lever 304 which is under the action of spring 305.

It should be remembered that, when the carrier moves either to the right or to the left, rocking member 281 is in an oblique position with regard to plate 287, either under the action of automatic control as hereabove described, or under the action of manual control by an operator, as will be hereafter described. The effect of this positioning is that one of the studs 307 fast with said plate 287 will be very close to the bent edge 308 of corresponding lever 304, and when lever 304 tilts, its bent edge 308 will cooperate with corresponding stud 307, thus causing plate 287 to revert to its original position, parallel to rocking member 281.

Rocking member 281 will then exert a pressure on shafts 275 or 276 (Fig. 14) and triggers 267 or 268 will be disengaged from the corresponding ratchet-wheels 271 or 272 and the carrier will stop.

It is clear that, in order that this unclutching may take place, the carrier will have to be slightly beyond its stopping position, but at this moment the same lock 297 which causes the unclutching will cause the carrier to return to its correct position under the action of lever 304 which is under the action of spring 305 exerting a pressure on the tabulating stop.

It is conceivable that the rocking movement of plate 287 being too rapid, the carrier might be clutched in again in the opposite sense, as a result of the inertia of said plate 287, in the event that the corresponding ball 286 should not be sufficiently maintained by its spring to cause the rocking member 281 to stop in its neutral position. In order to do away with this risk, levers 309 are rotatively mounted on plate 298 and are provided at one end with heads 310 whereas their other end acts as a stop to studs 307. The weight of said heads is so established as to counterbalance the shooting action of plate 287 resulting from too fast an unclutching of the driving members.

In Figs. 16 and 17, the machine being seen frontwards, the left hand end of shaft 290 which, as already explained, may slide parallel to its axis, is provided with a sickle shaped plate 320 (Figs. 16 and 17).

The position of said plate 320 with respect to the left hand end of shaft 290 is so established that when said shaft 290 has slid to the right and lever 291 is able to rock roller 288, the upper edge of plate 320 cooperates with the bent edge of lever 300 and left lock 297 is driven back. The result thereof is that the carrier can be moved towards the left (to the right if Fig. 15 is considered) until the tabulating stop (Fig. 18) produces a self-unclutching action as hereabove described.

Shaft 290 being placed to the right, the carrier will move to the left, looking at the machine frontwards, or to the right if Figure 15 is considered.

The value of said tabulating movement will be determined by the position of the tabulating stops 296 which will have been fixed onto the tabulating bar 295. It should be noticed that these tabulating movements will not be accompanied by a space line movement, i. e. by a rotation of roller 219, because rack 245 submitted to the action of rod 247 will exert a pressure on lever 248 in the opposite direction to that causing the space-line operation (Fig. 15). If the opposite direction is considered, triggers 268 will be engaged with ratchet wheel 272 and, in this case, rack 245 will be driven to the right (to the left if Figure 15 is considered) by wheel 246. Meanwhile, bar 295 is locked by locks 297 (Fig. 18); since this bar can not be moved, it is the rack 245 which will slide on cross bar 244, carrying out the space-line operation. The next movement, that is to say the self-unclutching when the maximum slide of the rack authorised by the length of the slots is attained, is carried out in the above described manner.

Sliding of shaft 290 to the right or to the left is controlled by the operator by means of a lever 322 rotatively mounted on flange 3 of the machine and provided with a compensating device 318, comprising a lever, spring and rod 323.

When the operator pushes the lever to the right, shaft 290 slides to the left, thus setting the unclutching and driving members, above described, in a position for carrying out a space-line operation, whereas, pushed in the opposite way, the same members cause a tabulating movement.

The three positions of the rocking member 281 causing the movement to the left or to the right or the standstill of the carrier, may be controlled by the operator by means of the devices hereafter described.

Fig. 17 shows a plate 311 rotatively mounted on cover 302 and provided with studs 312 which are capable, after plate 311 has rocked by a given angle, of cooperating in pushing either of studs 307 fast with plate 287 so that said plate 287, and, therefore, rocking member 281, may pass from a non-driving parallel position to an oblique driving position towards the left or the right.

Plate 311 is also provided with two cam-shaped edges 313 capable of cooperating with either of studs 314, fast with one or the other of levers 300, in order to cause corresponding lever 300 to rock a little before the clutching action is effectuated.

Tilting of one of levers 300 has for its consequence, as hereabove seen, to drive back lock 297 in which said lever is engaged by its rounded end, so that tabulating stop 296 will be unlocked and allow the carrier to be moved in the desired direction.

A lever 315 (Fig. 17) rotatively mounted on flange 3 of the machine is provided with a compensating device 318 comprising two levers, a stop and a spring. Said lever 315 cooperates with a rod 316, connecting the end of lever 315 to plate 311. The handle of said lever enables the operator to control the clutching device in order to drive the carrier to the right or to the left, until the moment when the next tabulating stop causes the self-unclutching action as above described.

In the case of the operator desiring that the movement of the carrier be longer than that determined by the tabulating stops, either to the right, or to the left, he need only maintain his pressure on the handle, which results in causing the corresponding lock to be held back for a longer period.

Plate 311 is provided with a security arm 317; should the operator continue, by mistake, to indefinitely maintain the pressure on lever 315, this security arm would come back to its upright position under the action of stops opposing the action of spring 318, said stops being fixed on the ends of the carrier.

The clutching and unclutching device which has been described, operates as long as shaft 262 (Figs. 2 and 15) continues to rotate.

In order to avoid a continuous rotation, a switch 319 (Figs. 2 and 17) is provided, which applies voltage across the terminals of the motor only when plate 287 is oblique, or in a right or left driving position. In the intermediary or resting position, plate 287 cooperates with the blade of a contact to cut off the voltage across the terminals of said motor.

AUTOMATIC SELECTION OF COUNTING UNITS AND FUNCTIONS

Figure 22:
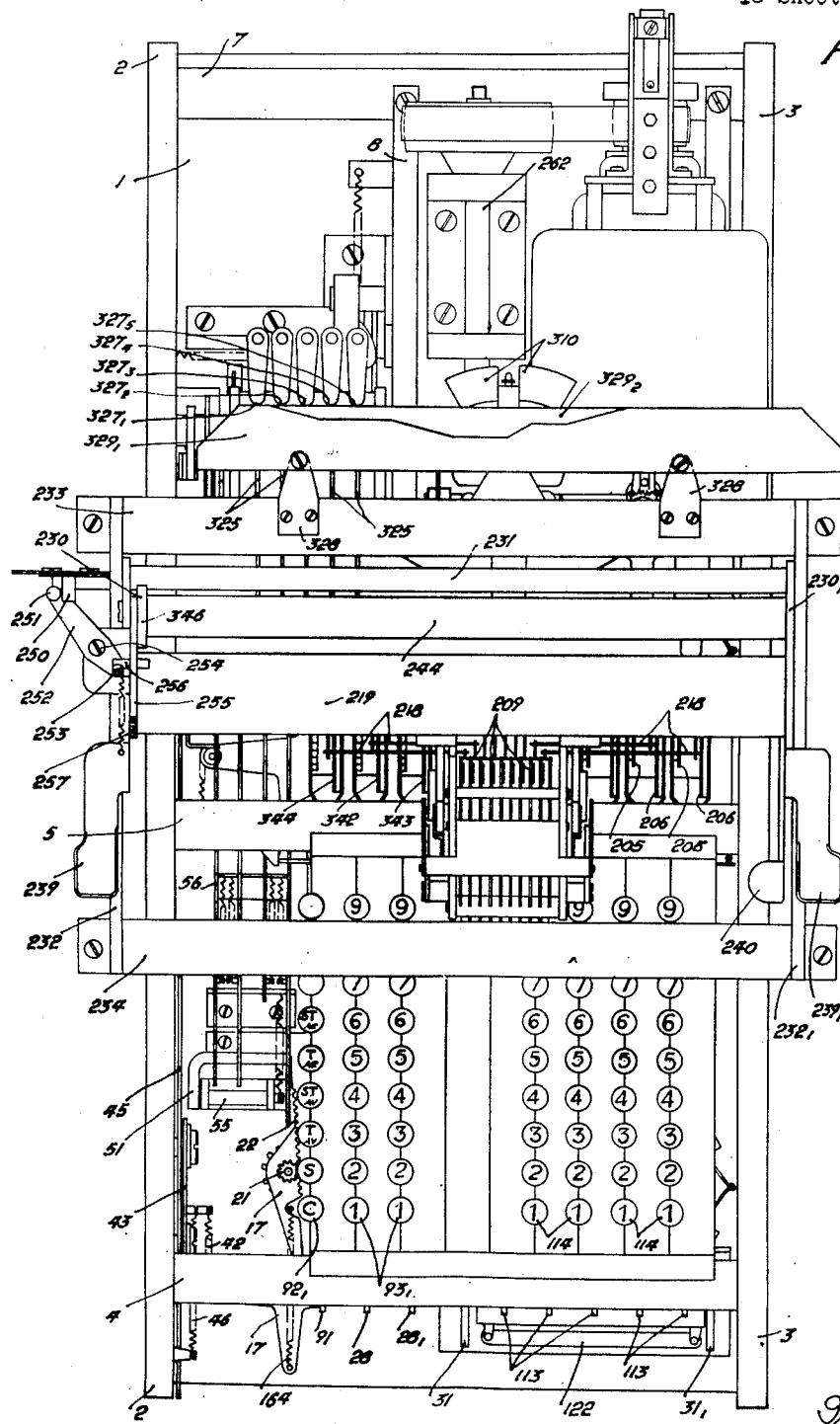
Fig. 22 is a plan view from above of the whole of the machine, the cover being removed.
Figure 23:
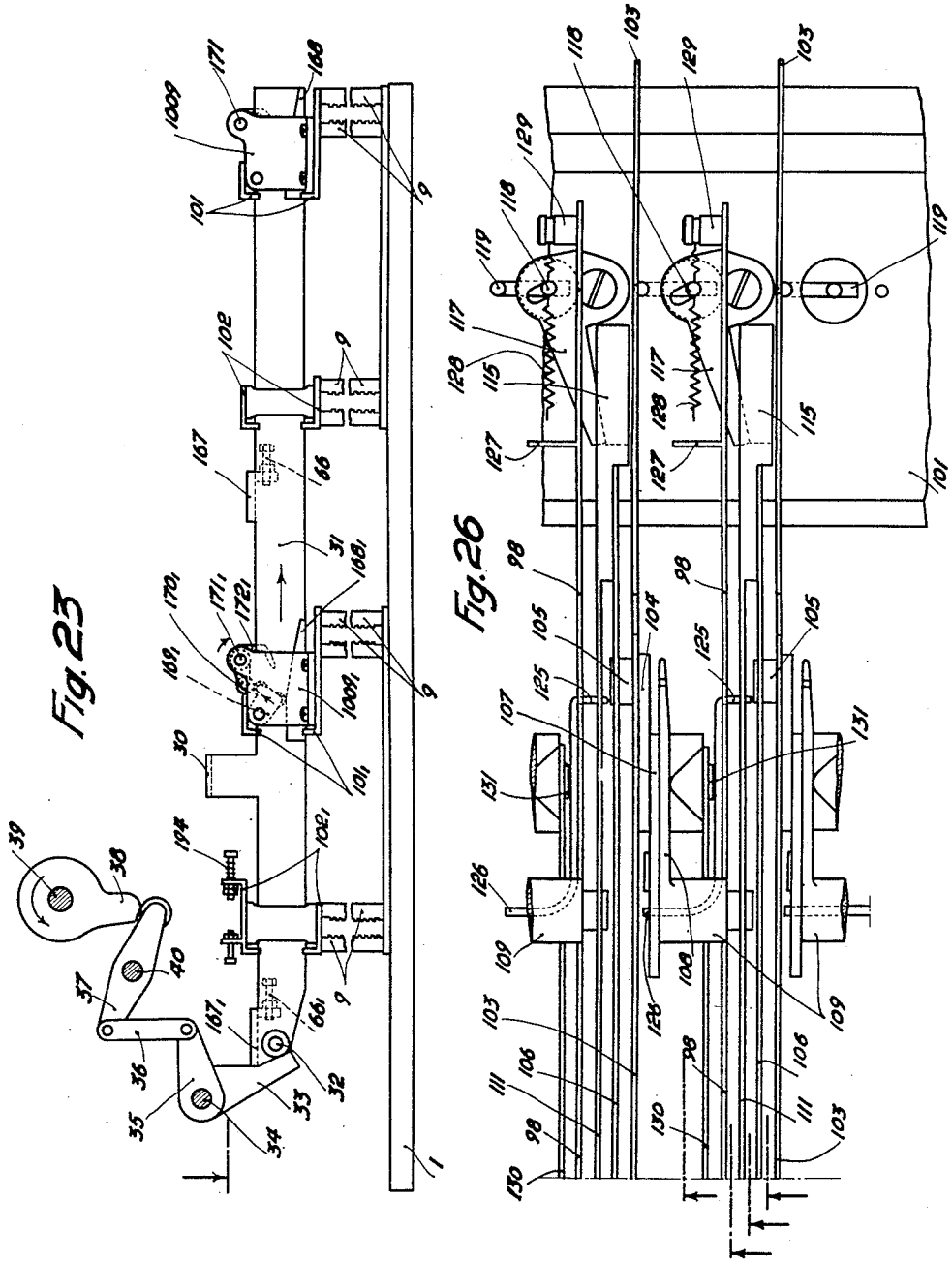
Fig. 23 is a side elevational view, at a larger scale, of a sliding bar controlling the selection of the counting frames.

It is possible to select the counting units otherwise than through keys $93_1$ to $93_9$ as explained above. With this object in view, selecting members are provided which cooperate with the carrier, according to the lateral positions of said carrier. As shown at Fig. 1, levers 324 are rotatively mounted on a double support 326 fast with rail 242. Each lever 324 is provided on its upper arm with a roller $327_1$ to $327_5$. There are therefore as many levers 324 as there are decimal numerations in the number of counting units selected by the machine. One supplementary lever 324 is provided for the selecting of the functions. On a base 328 fast with bar 233 are fixed, parallel and one on top of the other, selecting slides $329_1$, $329_2$, $329_3$, $329_4$ and 330. Each of these slides is provided, according to the position of the corresponding tabulating stop, with notches, the depth of which is proportional to the figure to which it corresponds in one of the numeration orders (Fig. 22). In order to automatically select for example counting unit 65, in the rear section, and counting unit 72 in the front section in a determined position of the carrier, a deep notch of six pitches is provided in slide $329_4$ and another deep notch of five pitches in slide $329_3$, as well as a deep notch of seven pitches in slide $329_2$ and a deep notch of two pitches in slide $329_1$.

Said notches are such that when the carrier is stopped by tabulating stop 296, indicating the desired tabulation, these notches are opposite the rollers $327_1$ to $327_5$ of the corresponding lever 324. Slide 330 operating the selection of functions will be notched in the same manner, but the notches provided in said slide, instead of corresponding to the figures of the number of the counting unit, will correspond to the pitch of keys $92_1$ to $92_5$ above mentioned. Vertically sliding members 331 are provided on appropriate guides fixed on the printing support 213. Said members are each provided with a roller 332 cooperating with the lower arm 334 of levers 324 and enabling members 331 to slide downwards a value proportional to the depth of the notch in the corresponding slide 329. Slides with catches 333 are fast with stop bars 28, $28_1$ and 91, so that when said stop bars are released by cross bar 30, they advance under the action of springs 164, $164_1$ and 84 respectively and this progressing depends upon the vertical sliding position of the corresponding sliding member 331. The proportion between the length of the two lever arms 324, as well as the shape of the profile of said lever arms will be calculated in order to establish the desired correspondence between the depth of said notches and the sliding of said stop bars 28, $28_1$ and 91.

It should be recalled that the different lengths of said sliding movement determine the selection of the counting units and the functions "Total" and "Sub-total" in each section of the machine and also that of the function "subtraction," in both sections at the same time.

What I claim is:

1. A tens transfer mechanism for a calculating machine incorporating a number of piled up counting frames adapted to slide laterally and individually and each containing longitudinally extending, parallel slides in a number equal to that of the orders of numeration which it is desired to register in the machine, the slides corresponding to a same order of numeration being controlled by a sliding angle member adapted to engage notches provided along one side thereof and linked to a driving bar the longitudinal position of which is controlled by a stop bar cooperating with the keys of a keyboard, the said mechanism comprising, for each order of numeration, a transfer bar and a locking bar for locking said transfer bar against any effective movement, said bars being longitudinally guided in the machine, submitted to the action of a spring and provided with guiding slopes whereby the said bars are displaced perpendicularly to their direction of movement when moved under the action of said springs, a rocking plate rotatably mounted on the driving bar corresponding to the considered order of numeration, the said plate being provided on one hand with a stud engaging in a longitudinal slot provided in the transfer bar corresponding to the order of numeration immediately below that which is considered, and on the other hand with a trunnion on which are rotatably mounted a ratchet adapted to engage in one direction an extension of the movable angle member corresponding to the considered order of numeration and a counter-ratchet adapted to engage the said extension in the other direction, the said counterratchet carrying a stud engaging in a longitudinal slot provided in the locking bar corresponding to the considered order of numeration, a vertical, rotatable shaft arranged on one side of each of the piles of counting slides, the said shaft being provided with a laterally extending lug adapted to cooperate with a shoulder of each of the counting slides, whereby the said shaft is rotated when any slide in the corresponding pile reaches one of its extreme positions, and a stud eccentrically carried by said shaft and engaging a slot provided in a lever rotatably arranged in the machine and adapted to lock against longitudinal movement the locking bar of the corresponding order of numeration, the said lever in the highest order of numeration being linked by means of a rod to a similar lever adapted to lock the transfer bar corresponding to the lowest order of numeration, means being provided alternately to lock and unlock the locking bars and consequently the transfer bars and to bring the said bars back to their original position once they have moved under the action of their respective springs, and means being provided to push the driving bars back to their original position after they have moved, under the action of a spring, by a distance which is determined by the key which has been depressed in the corresponding part of the keyboard.

2. A tens transfer mechanism according to claim 1, in which the means for locking and unlocking the transfer bars and locking bars comprises two bars adapted to slide longitudinally in guides secured to the body of the machine, the said bars being provided with ramps which cooperate with a first lever by means of a roller acting by means of a second roller on levers keyed on a transverse shaft rotatably mounted in the general frame of the machine and carrying locking fingers which cooperate with the locking bars, a rotating cam being provided to control the sliding movement of the said bars, the said cam being keyed on a driving shaft adapted to turn one revolution during an operating cycle of the machine, in such a manner that the transfer bars and locking bars are released at the beginning of each cycle by the locking fingers so as to be, if transfers are necessary, free to move under the action of the corresponding springs, and if operated, are pushed back to their original position by the said locking fingers at the end of each cycle.

3. A tens transfer mechanism according to claim 2, in which the means for pushing the driving bars back to their original position comprises, for each driving bar, a lever keyed on a shaft rotatably mounted in the general frame of the machine and controlled, by means of a lever and rod unit, by means of a second cam keyed on the same shaft as the first cam which controls the bars controlling the locking members of the transfer and locking bars, the said second cam being angularly offset with respect to the first in such a manner that the driving bars are released and made free to move under the action of corresponding springs immediately after the releasing of the transfer and locking bars, whereas the said driving bars are pushed back to their original position immediately before the transfer and locking bars.

References Cited in the file of this patent

UNITED STATES PATENTS

| | | |
|---|---|---|
| 2,029,776 | Jacob | Feb. 4, 1936 |
| 2,142,346 | Breitling et al. | Jan. 3, 1939 |
| 2,195,719 | Dahlberg | Apr. 2, 1940 |
| 2,438,036 | Carroll et al. | Mar. 16, 1948 |
| 2,562,172 | Campos | July 31, 1951 |